US006741027B1

(12) United States Patent
Cummings et al.

(10) Patent No.: US 6,741,027 B1
(45) Date of Patent: May 25, 2004

(54) PROTECTED SUBSTRATE STRUCTURE FOR A FIELD EMISSION DISPLAY DEVICE

(75) Inventors: William J. Cummings, San Francisco, CA (US); Kris E. Sahlstrom, Santa Cruz, CA (US); Shiyou Pei, Saratoga, CA (US); Bob L. Mackey, San Jose, CA (US); Arthur J. Learn, Cupertino, CA (US); John D. Porter, Berkeley, CA (US); Theodore S. Fahlen, San Jose, CA (US)

(73) Assignees: Candescent Technologies Corporation, Los Gatos, CA (US); Candescent Intellectual Property Services, Inc., Los Gatos, CA (US)

( * ) Notice: Subject to any disclaimer, the term of this patent is extended or adjusted under 35 U.S.C. 154(b) by 0 days.

(21) Appl. No.: 09/895,699

(22) Filed: Jun. 29, 2001

Related U.S. Application Data

(63) Continuation-in-part of application No. 09/627,355, filed on Jul. 28, 2000, which is a continuation-in-part of application No. 09/087,785, filed on May 29, 1998, now Pat. No. 6,215,241.

(51) Int. Cl.[7] ............................ H01J 1/62; H01J 61/35; B32B 15/00

(52) U.S. Cl. ........................ 313/495; 313/635; 428/432

(58) Field of Search ................................. 313/495, 493, 313/489, 635, 110, 292, 496, 497, 238; 428/690, 917, 432

(56) References Cited

U.S. PATENT DOCUMENTS

| | | | | | |
|---|---|---|---|---|---|
| 5,270,615 | A | * | 12/1993 | Chang | 313/635 |
| 5,811,919 | A | * | 9/1998 | Hoogsteen et al. | 313/422 |
| 5,909,081 | A | * | 6/1999 | Eida et al. | 428/917 |
| 6,037,712 | A | * | 3/2000 | Codama et al. | 313/498 |
| 6,144,155 | A | * | 11/2000 | Yoshikawa et al. | 313/495 |

* cited by examiner

*Primary Examiner*—Nimeshkumar D. Patel
*Assistant Examiner*—Sharlene Leurig

(57) ABSTRACT

A protected faceplate structure of a field emission display device is disclosed in one embodiment. Specifically, in one embodiment, the present invention recites a faceplate of a field emission display device wherein the faceplate of the field emission display device is adapted to have phosphor containing areas disposed above one side thereof. The present embodiment is further comprised of a barrier layer which is disposed over the one side of said faceplate which is adapted to have phosphor containing areas disposed thereabove. The barrier layer of the present embodiment is adapted to prevent degradation of the faceplate. Specifically, the barrier layer of the present embodiment is adapted to prevent degradation of the faceplate due to electron bombardment by electrons directed towards the phosphor containing areas.

21 Claims, 18 Drawing Sheets

PROTECTED SUBSTRATE STRUCTURE FOR A FIELD EMISSION DISPLAY DEVICE

CROSS REFERENCE TO RELATED APPLICATION

This Application is a Continuation-in-Part of co-pending, commonly-owned U.S. patent application Ser. No. 09/627,355, filed Jul. 28, 2000, by Haven et al., and entitled "PROTECTED SUBSTRATE STRUCTURE FOR A FIELD EMISSION DISPLAY DEVICE" which is a Continuation-in-Part of Ser. No. 09/087,785 filed May 29, 1998, now U.S. Pat. No. 6,215,241 issued Apr. 10, 2001 to Learn et al., and entitled "FLAT PANEL DISPLAY WITH ENCAPSULATED MATRIX STRUCTURE".

FIELD OF THE INVENTION

The present claimed invention relates to the field of flat panel displays. More particularly, the present claimed invention relates to the "black matrix" of a flat panel display screen structure.

BACKGROUND ART

Sub-pixel regions on the faceplate of a flat panel display are typically separated by an opaque mesh-like structure commonly referred to as a matrix or "black matrix". By separating sub-pixel regions, the black matrix prevents electrons directed at one sub-pixel from being overlapping another sub-pixel. In so doing, a conventional black matrix helps maintain color purity in a flat panel display. In addition, the black matrix is also used as a base on which to locate structures such as, for example, support walls. In addition, if the black matrix is three dimensional (i.e. it extends above the level of the light emitting phosphors), then the black matrix can prevent some of the electrons back scattered from the phosphors of one sub-pixel from impinging on another, thereby improving color purity.

Polyimide material may be used to form the matrix. It is known that polyimide material contains numerous components such as nitrogen, hydrogen, carbon, and oxygen. While contained within the polyimide material, these aforementioned constituents do not negatively affect the vacuum environment of the flat panel display. Unfortunately, conventional polyimide matrices and the constituents thereof do not always remain confined within the polyimide material. That is, under certain conditions, the polyimide constituents, and combinations thereof, are released from the polyimide material of the matrix. As a result, the vacuum environment of the flat panel display is compromised.

Polyimide (or other black matrix material) constituent contamination occurs in various ways. As an example, thermally treating or heating a conventional polyimide matrix can cause low molecular weight components (fragments, monomers or groups of monomers) of the polyimide material to migrate to the surface of the matrix. These low molecular weight components can then move out of the matrix and onto the faceplate. When energetic electrons strike the contaminant-coated faceplate, polymerization of the contaminants can occur. This polymerization, in turn, results in the formation of a dark coating on the faceplate. The dark coating reduces brightness of the display thereby degrading overall performance of the flat panel display.

In addition to thermally induced contamination, conventional polyimide matrices also suffer from electron stimulated desorption of contaminants. That is, during operation, a cathode portion of the flat panel display emits electrons which are directed towards sub-pixel regions on the faceplate. However, some of these emitted electrons will eventually strike the matrix. This electron bombardment of the conventional polyimide matrix results in electron-stimulated desorption of contaminants (i.e. constituents or decomposition products of the polyimide matrix). These emitted contaminants arising from the polyimide matrix are then deleteriously introduced into the vacuum environment of the flat panel display. The contaminants emitted into the vacuum environment degrade the vacuum, can induce sputtering, and may also coat the surface of the field emitters.

Furthermore, conventional polyimide matrices also suffer from X-ray stimulated desorption of contaminants. That is, during operation, X-rays (i.e. high energy photons) are generated by, for example, electrons striking the phosphors. Some of these generated X-rays will eventually strike the matrix. Such X-ray bombardment of the conventional polyimide matrix results in X-ray stimulated desorption of contaminants (i.e. constituents or decomposition products of the polyimide matrix). As described above, these emitted contaminants arising from the polyimide matrix are then deleteriously introduced into the vacuum environment of the flat panel display. Like electron stimulated contaminants, these constituents degrade the vacuum, can induce sputtering, and may also coat the surface of the field emitters.

The faceplate of a field emission cathode ray tube requires a conductive anode electrode to carry the current used to illuminate the display. A conductive black matrix structure also provides a uniform potential surface, reducing the likelihood of electrical arcing. Unfortunately, conventional polyimide matrices are not conductive. Therefore, local charging of the black matrix surface may occur and arcing may be induced between the cathode and a conventional matrix structure.

Thus, a need exists for a matrix structure which does not deleteriously outgas when subjected to thermal variations. Another need exists for a matrix structure which meets the above-listed need and which does not suffer from unwanted electron- or photon-stimulated desorption of contaminants. Finally, still another need exists for a matrix structure which meets both of the above needs and which also achieves electrical robustness in the faceplate by providing a constant potential surface, which reduces the possibility of arcing.

Additionally, during operation of a field emission display device, electrons are emitted from field emitters located at a cathode portion of the field emission display device. These emitted electrons are then accelerated, using a potential field, towards phosphor containing areas. Upon being impinged by the electrons, the phosphors within the phosphor containing areas generate light. Unfortunately, a conventional faceplate is subject to degradation when bombarded by electrons which ultimately impinge the faceplate. It is thought that the bombarding electrons break chemical bonds in the faceplate. The breakage of the chemical bonds then causes the faceplate to be light absorbing and, hence, is deleterious to the operation of the field emission display device.

As yet another drawback, electron bombardment of the faceplate may also cause conventional faceplates to outgas constituents thereof. As an example, it is desired, in some applications, to use inexpensive high-sodium glass for the faceplate. However, electron bombardment of such inexpensive high-sodium glass causes unwanted migration of contaminants (e.g. sodium) from the faceplate into the active region of the field emission display device. Such migration of contaminants can result in harmful contamination of sensitive device elements (e.g. field emitters).

In addition to degrading the faceplate, electron bombardment can also degrade the cathode substrate structure of the field emission display device. This degradation is due to electron bombardment by electrons originating from electron emitting structures wherein the electrons are in some way deflected against the cathode substrate structure. As an example of the drawback associated with electron bombardment of the cathode substrate structure, it is desired, in some applications, to use inexpensive high-sodium glass for the cathode substrate structure. However, electron bombardment of such inexpensive high-sodium glass causes unwanted migration of contaminants (e.g. sodium) from the cathode substrate structure into the active region of the field emission display device. Such migration of contaminants can result in harmful contamination of sensitive device elements (e.g. field emitters).

Thus, a need exists for a method and apparatus for preventing electron bombardment and subsequent degradation of a faceplate of a field emission display device. A need also exists for a method and apparatus for preventing electron bombardment and subsequent degradation of a cathode substrate structure of a field emission display device. Still another need exists for a method and apparatus which prevents the migration of contaminants from a substrate structure (e.g. the faceplate or the cathode substrate structure) into the active region of the field emission display device.

SUMMARY OF INVENTION

The present invention provides in one embodiment, a method and apparatus for preventing electron bombardment and subsequent degradation of a faceplate of a field emission display device. The present invention further provides in one embodiment, a method and apparatus for preventing electron bombardment and subsequent degradation of a cathode substrate structure of a field emission display device. The present invention further provides in one embodiment, a method and apparatus which prevents the migration of contaminants from a substrate structure (e.g. the faceplate or the cathode substrate structure) into the active region of the field emission display device.

Specifically, in one embodiment, the present invention recites a faceplate of a field emission display device wherein the faceplate of the field emission display device is adapted to have phosphor containing areas disposed above one side thereof. The present embodiment is further comprised of a barrier layer which is disposed over the one side of said faceplate which is adapted to have phosphor containing areas disposed thereabove. The barrier layer of the present embodiment is adapted to prevent degradation of the faceplate. Specifically, the barrier layer of the present embodiment is adapted to prevent degradation of the faceplate due to electron bombardment by electrons directed towards the phosphor containing areas.

In another embodiment, the present invention includes a cathode substrate structure having a barrier layer disposed thereon. The barrier layer of the present embodiment is adapted to prevent degradation of the cathode substrate structure. Specifically, the barrier layer of the present embodiment is adapted to prevent degradation of the cathode substrate structure due to electron bombardment by electrons originating from field emitters of the field emission display device.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail so as not to unnecessarily obscure aspects of the present invention.

Figure 1A:
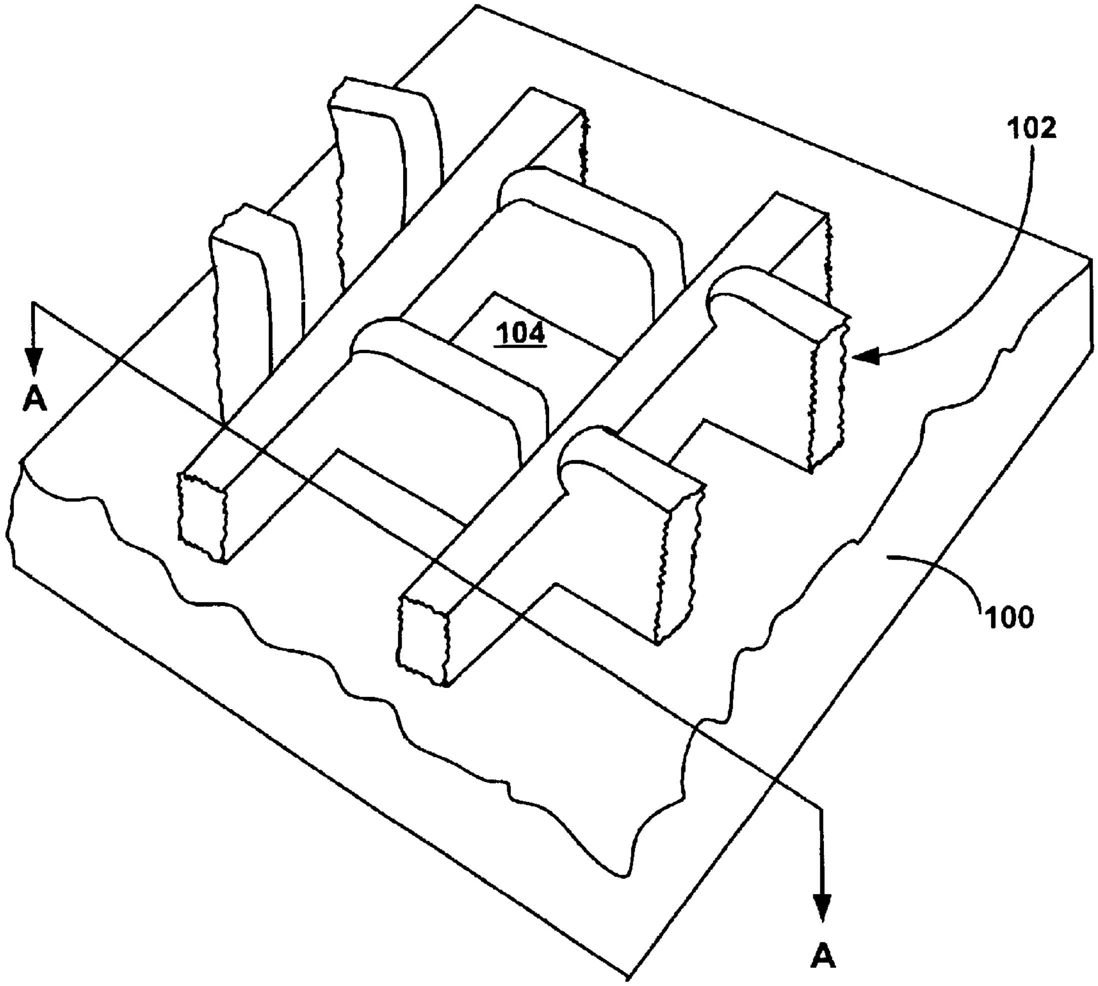
FIG. 1A is a perspective view of a faceplate of a flat panel display device having a matrix structure disposed thereon in accordance with one embodiment of the present claimed invention.

With reference now to FIG. 1A, a first step used by the present embodiment in the formation of an encapsulated matrix is shown. More specifically, FIG. 1A shows a perspective view of a faceplate 100 of a flat panel display device having a matrix structure 102 coupled thereto. In the embodiment of FIG. 1A, matrix structure 102 is located on faceplate 100 such that the row and columns of matrix structure 102 separate adjacent sub-pixel regions, typically shown as 104. Additionally, in the present embodiment, matrix structure 102 is formed of polyimide material. Although matrix structure 102 is formed of polyimide material in the present embodiment, the present invention is also well suited to use with various other matrix forming materials which may cause deleterious contamination. As an example, the present invention is also well suited for use with a matrix structure which is comprised of a photosensitive polyimide formulation containing components other than polyimide.

With reference still to FIG. 1A, matrix structure 102 is a "multi-level" matrix structure. That is, the rows of matrix structure 102 have a different height than the columns of matrix structure 102. Such a multi-level matrix structure is shown in the embodiment of FIG. 1A in order to more clearly show sub-pixel regions 104. The present invention is, however, well suited to use with a matrix structure which is not multi-level. Although the matrix structure of the present invention is sometimes referred to as a black matrix, it will be understood that the term "black" refers to the opaque characteristic of the matrix structure. That is, the present invention is also well suited to having a color other than black. Furthermore, in the following Figures, only a portion of the interior surface of a faceplate is shown for purposes of clarity. Additionally, the following discussion specifically refers to a black matrix which is encapsulated by a contaminant prevention structure in accordance with one embodiment of the present claimed invention. Although such a specific recitation is found below, the present invention is also well suited for use with various other physical components of a flat panel display device. Also, although some embodiments of the present invention refer to a matrix structure for defining pixel and/or sub-pixel regions of the flat panel display, the present invention is also well suited to an embodiment in which the pixel/sub-pixel defining structure is not a "matrix" structure. Therefore, for purposes of the present application, the term matrix structure refers to a pixel and/or sub-pixel defining structure and not to a particular physical shape of the structure.

Figure 1B:
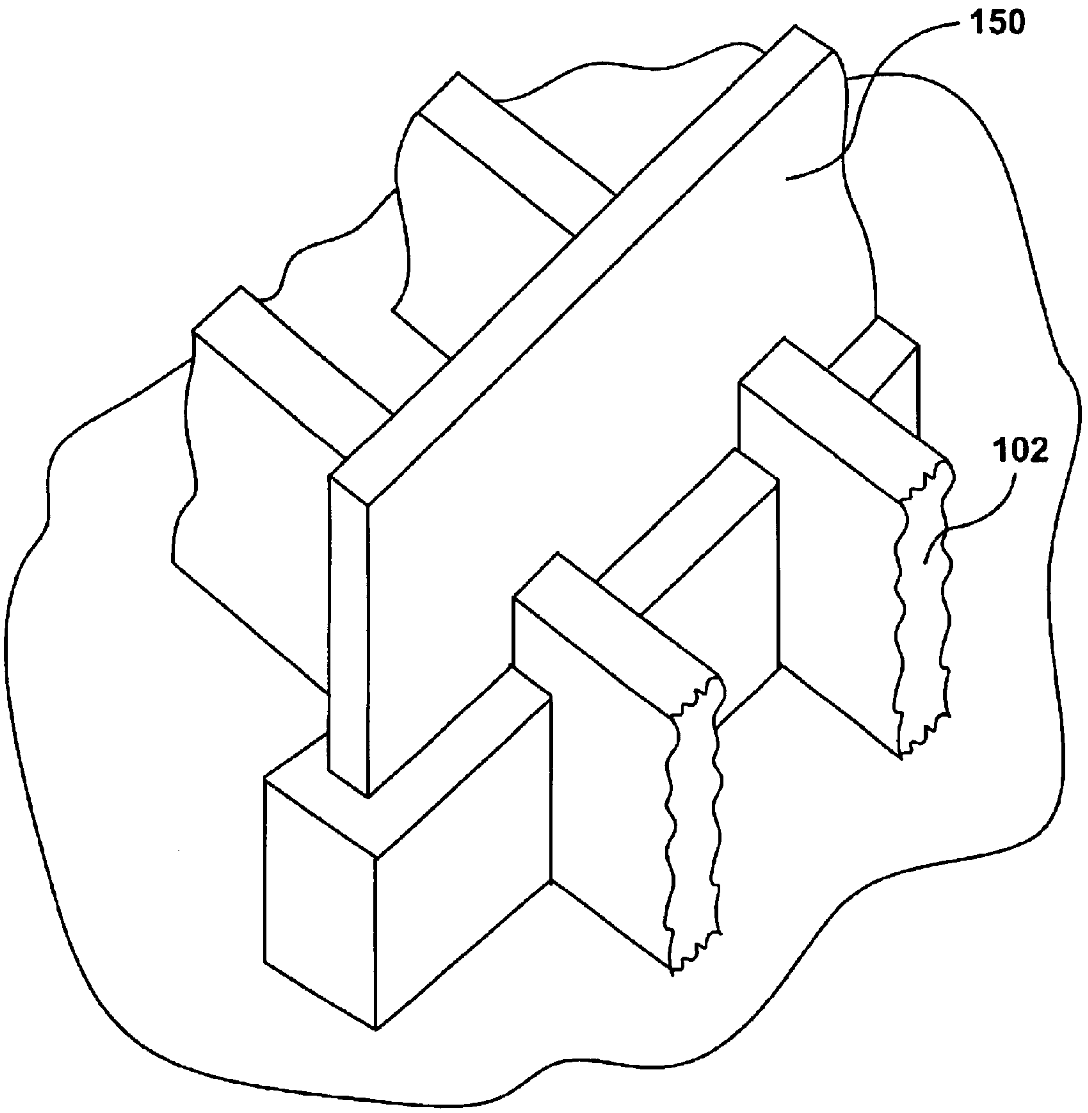
FIG. 1B is a perspective view of a support structure of a flat panel display device wherein the support structure is to be encapsulated in accordance with one embodiment of the present claimed invention.

Referring now to FIG. 1B, a perspective view of a support structure 150 adapted to be encapsulated by a contaminant prevention structure in accordance with one embodiment of the present claimed invention is shown. As will be described below, in great detail, in conjunction with a matrix structure embodiment, in the present embodiment support structure 150 is encapsulated by a contaminant prevention structure. That is, the contaminant prevention structure has a physical structure such that contaminants originating within support structure 150 are confined within support structure 150. Thus, the contaminant prevention structure prevents contaminants which are generated within support structure 150 from migrating outside of support structure 150. In addition to confining contaminants within support structure 150, the material comprising the contaminant prevention structure of the present invention does not outgas contaminants when struck by electrons emitted from a cathode portion of the flat panel display. Although support structure 150 is a wall in the embodiment of FIG. 1B, the present invention is also well suited to an embodiment in which the support structure is comprised, for example, of pins, balls, columns, or various other supporting structures.

Figure 1C:
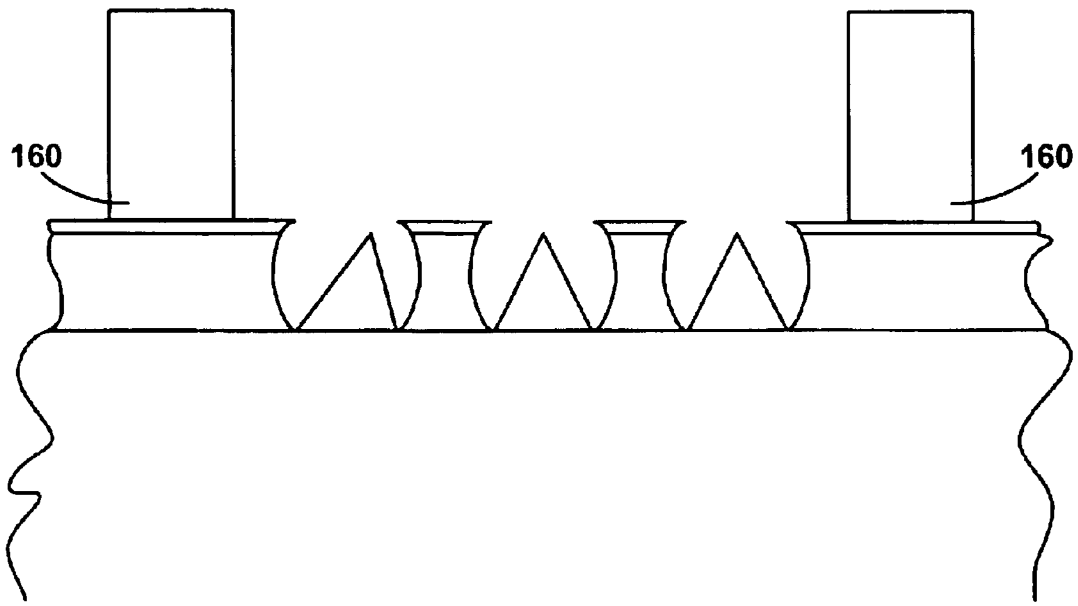
FIG. 1C is a side sectional view of a focus structure of a flat panel display device wherein the focus structure is to be encapsulated in accordance with one embodiment of the present claimed invention.

Referring now to FIG. 1C, a side sectional view of a focus structure 160 adapted to be encapsulated by a contaminant prevention structure in accordance with one embodiment of the present claimed invention is shown. As will be described below, in great detail, in conjunction with a matrix structure embodiment, in the present embodiment focus structure 160 is encapsulated by a contaminant prevention structure. That is, the contaminant prevention structure has a physical structure such that contaminants originating within focus structure 160 are confined within focus structure 160. Thus, the contaminant prevention structure prevents contaminants which are generated within focus structure 160 from migrating outside of focus structure 160. In addition to confining contaminants within focus structure 160, the material comprising the contaminant prevention structure of the present invention does not outgas contaminants when struck by electrons emitted from a cathode portion of the flat panel display. Although focus structure 160 is a waffle-like structure in the embodiment of FIG. 1C, the present invention is also well suited to an embodiment in which the focus structure has a different shape.

Figure 2:
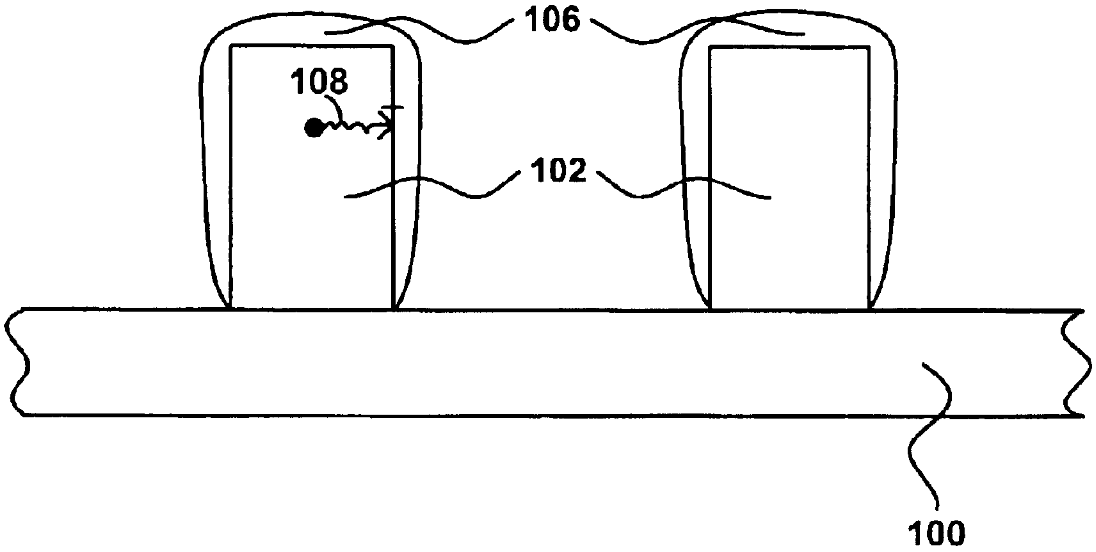
FIG. 2 is a side sectional view of the faceplate and matrix structure of FIG. 1A taken along line A—A wherein the matrix structure has a contaminant prevention structure disposed thereover in accordance with one embodiment of the present claimed invention.

Referring next to FIG. 2, a side sectional view of faceplate 100 and matrix structure 102 taken along line A—A of FIG. 1A is shown. In the side sectional view, only a portion of matrix structure 102 is shown for purposes of clarity. It will be understood, however, that the following steps are performed over a much larger portion of matrix structure 102 and are not limited only to those portion of matrix structure 102 shown in FIG. 2. Additionally, the following steps used in the formation of the present invention are also well suited to an approach in which a preliminary bake-out step is used to initially purge some of the contaminants from the matrix. In a bake-out step, the matrix is heated prior to placing the matrix in the sealed vacuum environment of the flat panel display.

Referring again to FIG. 2, in one embodiment of the present invention, a contaminant prevention structure 106 is disposed covering matrix structure 102. In this embodiment, contaminant prevention structure 106 is comprised of a layer of substantially non-porous material. That is, matrix structure 102 has a physical structure such that contaminants originating within matrix structure 102 are confined within matrix structure 102. Thus, contaminant prevention structure 106 prevents contaminants which are generated within matrix structure 102 from migrating outside of matrix structure 102. In addition to confining contaminants within matrix structure 102, the material comprising contaminant prevention structure 106 of the present invention does not outgas contaminants when struck by electrons emitted from a cathode portion of the flat panel display.

With reference again to FIG. 2, arrow 108 depicts the path of a contaminant generated within matrix structure 102. It will be understood that such contaminants include species such as, for example, $N_2$, $H_2$, $CH_4$, CO, $CO_2$, $O_2$, and $H_2O$. As shown by arrow 108, contaminant prevention structure 106 prevents contaminants from being emitted from matrix structure 102.

With reference still to FIG. 2, as stated above, in the present embodiment, contaminant prevention structure 106 is comprised of a substantially non-porous material. In one embodiment, the substantially non-porous material of contaminant prevention structure 106 is selected from the group consisting of: silicon oxide, a metal film, an inorganic solid, and the like.

Referring still to FIG. 2, in another embodiment, the substantially non-porous material of contaminant prevention structure 106 is comprised of an oxide, or oxides, of the lanthanide series. Moreover, in one embodiment, the substantially non-porous material of contaminant prevention structure 106 is selected from the group consisting of: $Y_2O_3$, $La_2O_3$, $CeO_2$, $Pr_4O_{11}$, $Nd_2O_3$, $Pm_2O_3$, $Sm_2O_3$, $EuO_2$, $Gd_2O_3$, $TbO_2$, $Dy_2O_3$, $Ho_2O_3$, $Er_2O_3$, $Tm_2O_3$, $Yb_2O_3$, $Yb_2O_3$ and $Lu_2O_3$, and their mixtures. It should be noted that the stoichiometries presented herein are exemplary and the present invention is well suited to the use of various other stoichiometries. In an embodiment in which the contaminant prevention structure 106 is comprised of an oxide, or oxides, of the lanthanide series, several advantages are realized. As an example, most of the oxides of the lanthanide series are transparent to visible light due to a wide band gap (e.g. approximately 5 eV). Furthermore, in contrast to silicon dioxide, oxides of the lanthanide series have a lower oxygen loss/emission under electron bombardment because of stronger oxygen-metal bonding. Specifically, oxides of the lanthanide series exhibit oxygen-metal bonding which is approximately 40 percent greater than the oxygen-metal bonding associated with silicon dioxide. As yet another benefit, by using an oxide, or oxides, of the lanthanide series as the contaminant structure material, the thickness of the contaminant structure can be reduced by a factor of four. That is, because of the higher atomic number and densities, the electron stopping distance in the lanthanide oxide-based contaminant structure is reduced by a factor of four compared to a contaminant structure formed of silicon dioxide.

In another embodiment, the substantially non-porous material of contaminant prevention structure 106 is comprised of a material selected from the group consisting of: high density oxides, nitride, $Gd_2O_3$, $Yb_2O_3$, $HfO_2$, $GdN_x$, $HfN_x$, and their mixtures. It should be noted that the stoichiometries presented herein are exemplary and the present invention is well suited to the use of various other stoichiometries. Compared with materials such as, for example, $SiO_2$ and $SiN_x$, the above listed materials are far more efficient in blocking electrons at energies greater than 10 keV. Furthermore, the above-listed materials match more closely to that of the D263 glass in coefficients of thermal expansion (CTE). As a result, the above-listed materials alleviate problems associated with glass cracking and bending. Also in the present embodiment, the materials used may be semi transparent as opposed to transparent such that transmission is greater than approximately 50 percent for optical wavelengths.

The present embodiment is also well suited to the use of material such as aluminum, beryllium, and chemical vapor deposited silicon oxide for non-porous prevention structure 106. Moreover, the present invention is well suited to an embodiment in which the material of non-porous prevention structure 106 is a solid with a melting point of greater than approximately 500 degrees Celsius. In one embodiment, the substantially non-porous material is deposited over matrix structure 102 by chemical vapor deposition (CVD), evaporation, sputtering, or other means, to a thickness of approximately 50–500 nanometers. It will be understood, however, that the present invention is well suited to the use of various other substantially non-porous materials which are suited to confining contaminants within matrix structure 102. The present invention is also well suited to varying the thickness of contaminant prevention structure 106 to greater than or less than the thickness range listed above.

With reference still to FIG. 2, in one embodiment of the present invention, contaminant prevention structure 106 has a thickness which is sufficient to prevent penetration by electrons directed towards faceplate 100. In one such embodiment, contaminant prevention structure 106 is comprised of a layer of silicon dioxide deposited covering matrix 102 by CVD, evaporation, sputtering, or other means, to a thickness of approximately 100–500 nanometers. As a result, such an embodiment confines thermally generated contaminants within or on the surface of matrix structure 102, and further prevents contaminants from being formed by electron stimulated desorption. That is, the present embodiment substantially eliminates a major deleterious condition associated with electron bombardment of matrix structure 102. In one such embodiment in which the contaminant prevention structure prevents penetration therethrough by electrons, the contaminant prevention structure does not hermetically seal the underlying component. Although silicon dioxide is specifically recited as the barrier layer material in one embodiment, and an oxide or oxides of the lanthanide series are recited in another embodiment, the present invention (including each of the above-listed embodiments, and each of the below listed embodiments is also well suited to the use of $Al_2O_3$, $CrO_x$, ZnO, $Si_3N_4$, $SiO_2$, $TaO_5$, Tin Oxide, ITO, $ZrO_2$, $Y_2O_3$, $TiO_2$, and MgO and combinations thereof as the barrier layer material.

Referring still to FIG. 2, in another embodiment of the present invention, contaminant prevention structure 106 again has a thickness which is sufficient to prevent penetration by electrons directed towards faceplate 100. In the present embodiment, contaminant prevention structure 106 is comprised of a layer of oxide or oxides of the lanthanide series (e.g. $Y_2O_3$, $La_2O_3$, $CeO_2$, $Pr_4O_{11}$, $Nd_2O_3$, $Pm_2O_3$, $Sm_2O_3$, $EuO_2$, $Gd_2O_3$, $TbO_2$, $Dy_2O_3$, $Ho_2O_3$, $Er_2O_3$, $Tm_2O_3$, $Yb_2O_3$, $Yb_2O_3$ and $Lu_2O_3$, and their mixtures) deposited covering matrix 102 by CVD, evaporation, sputtering, or other means, to a thickness of approximately 25–125 nanometers. It should be noted that the stoichiometries presented herein are exemplary and the present invention is well suited to the use of various other stoichiometries. As a result, such an embodiment confines thermally generated contaminants within or on the surface of matrix structure 102, and further prevents contaminants from being formed by electron stimulated desorption. That is, the present embodiment substantially eliminates a major deleterious condition associated with electron bombardment of matrix structure 102. In one such embodiment in which the contaminant prevention structure prevents penetration therethrough by electrons, the contaminant prevention structure does not hermetically seal the underlying component. Although a layer of oxide or oxides of the lanthanide series is specifically recited as the barrier layer material in one embodiment, the present invention (including each of the above-listed embodiments, and each of the below listed embodiments is also well suited to the use of $Al_2O_3$, $CrO_x$, ZnO, $Si_3N_4$, $SiO_2$, $TaO_5$, Tin Oxide, ITO, $ZrO_2$, $Y_2O_3$, $TiO_2$, and MgO and combinations thereof as the barrier layer material.

In another embodiment, contaminant prevention structure 106 is comprised of a material selected from the group consisting of: high density oxides, nitride, $Gd_2O_3$, $Yb_2O_3$, $HfO_2$, $GdN_x$, $HfN_x$, and their mixtures. It should be noted that the stoichiometries presented herein are exemplary and the present invention is well suited to the use of various other stoichiometries. Compared with materials such as, for example, $SiO_2$ and $SiN_x$, the above listed materials are far more efficient in blocking electrons at energies greater than 10 keV. Furthermore, the above-listed materials match more closely to that of the D263 glass in coefficients of thermal expansion (CTE). As a result, the above-listed materials alleviate problems associated with glass cracking and bending. Also in the present embodiment, the materials used may be semi transparent as opposed to transparent such that transmission is greater than approximately 50 percent for optical wavelengths.

Figure 3:
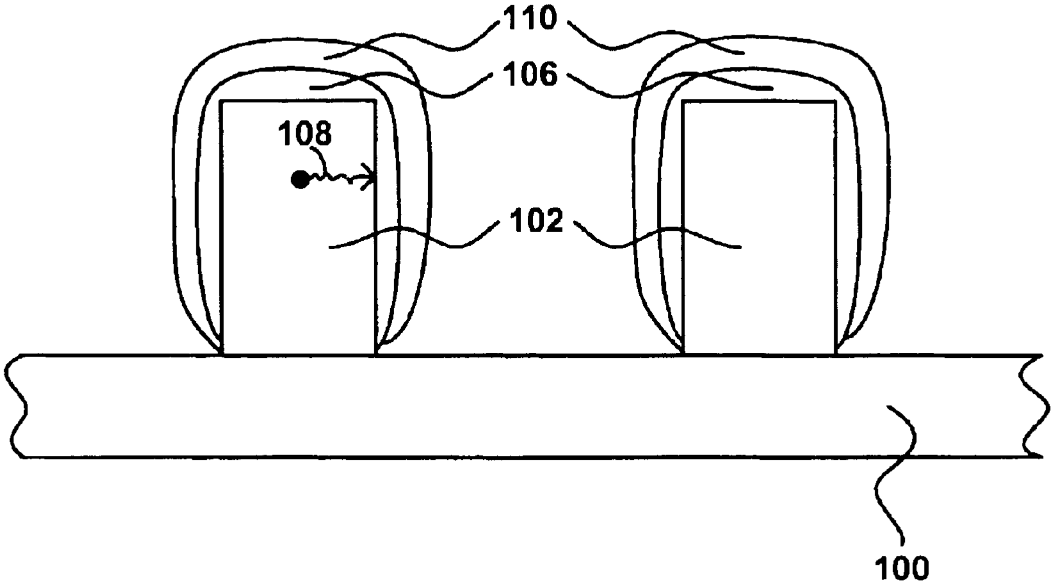
FIG. 3 is a side sectional view of the faceplate and matrix structure of FIG. 1A taken along line A—A wherein the matrix structure has a multi-layer contaminant prevention structure disposed thereover in accordance with one embodiment of the present claimed invention.

With reference next to FIG. 3, in the present embodiment, a multi-layer contaminant prevention structure is disposed covering matrix structure 102. In this embodiment, the multi-layer contaminant prevention structure is comprised of a plurality of layers, 106 and 110, of substantially non-porous material. That is, matrix structure 102 has a physical structure such that contaminants originating within matrix structure 102 are confined within matrix structure 102. Thus, the present multi-layer contaminant prevention structure prevents contaminants which are generated within matrix structure 102 from migrating outside of matrix structure 102. In addition to confining contaminants within matrix structure 102, layers 106 and 110 comprising the multi-layer contaminant prevention structure of the present invention do not outgas contaminants when struck by electrons emitted from a cathode portion of the flat panel display.

As in the above-described embodiment, arrow 108 depicts the path of a contaminant generated within matrix structure 102. It will be understood that such contaminants include species such as, for example, $N_2$, $H_2$, $CH_4$, CO, $CO_2$, $O_2$, and $H_2O$. As shown by arrow 108, the present multi-layer contaminant prevention structure prevents contaminants from being emitted from matrix structure 102.

With reference still to FIG. 3, as stated above, in the present embodiment, multi-layer contaminant prevention structure is comprised of a plurality of layers of substantially non-porous material. In one embodiment, at least one of the substantially non-porous layers of material, 106 and 110, of the multi-layer contaminant prevention structure is selected from the group consisting of: silicon dioxide; a metal film; an inorganic solid, $Al_2O_3$, $CrO_x$, ZnO, $Si_3N_4$, $SiO_2$, $TaO_5$, Tin Oxide, ITO, $ZrO_2$, $Y_2O_3$, $TiO_2$, and MgO, a layer of oxide, or oxides, of the lanthanide series, and combinations thereof and the like. The present embodiment is also well suited to the use of material such as aluminum, beryllium, and chemical vapor deposited silicon oxide for at least one of the substantially non-porous layers of material 106 and 110. Moreover, the present invention is well suited to an embodiment in which at least one of the non-porous layers of material 106 and 110 is comprised of a solid with a melting point of greater than approximately 500 degrees Celsius. In one embodiment, at least one of layers 106 and 110 is deposited over matrix structure 102 by chemical vapor deposition (CVD), evaporation, sputtering, or other means. In this embodiment, the multi-layer contaminant prevention structure has a total thickness of approximately 50–2000 nanometers. It will be understood, however, that the present invention is well suited to the use of various other substantially non-porous materials which are suited to confining contaminants within matrix structure 102. The present invention is also well suited to varying the total thickness of the multi-layer contaminant prevention structure to greater than or less than the thickness range listed above. Furthermore, the present invention is also well suited to varying the number of layers of substantially non-porous material which comprise the multi-layer contaminant prevention structure.

In this embodiment, the multi-layer contaminant prevention structure has a thickness which is sufficient to prevent penetration by electrons directed towards faceplate 100. In one such embodiment, the multi-layer contaminant prevention structure includes a layer of silicon dioxide deposited covering matrix 102 by CVD to a thickness of approximately 100–2000 nanometers. As a result, such an embodiment confines thermally generated contaminants within matrix structure 102, and further prevents contaminants from being formed by electron stimulated desorption. That is, the present embodiment substantially eliminates a major deleterious condition associated with electron bombardment of matrix structure 102.

In another embodiment, the multi-layer contaminant prevention structure has a thickness which is sufficient to prevent penetration by electrons directed towards faceplate 100. In one such embodiment, the multi-layer contaminant prevention structure includes a layer comprised of an oxide, or oxides, of the lanthanide series deposited covering matrix 102 by CVD to a thickness of approximately 25–125 nanometers. As a result, such an embodiment confines thermally generated contaminants within matrix structure 102, and further prevents contaminants from being formed by electron stimulated desorption. That is, the present embodiment substantially eliminates a major deleterious condition associated with electron bombardment of matrix structure 102.

Figure 4:
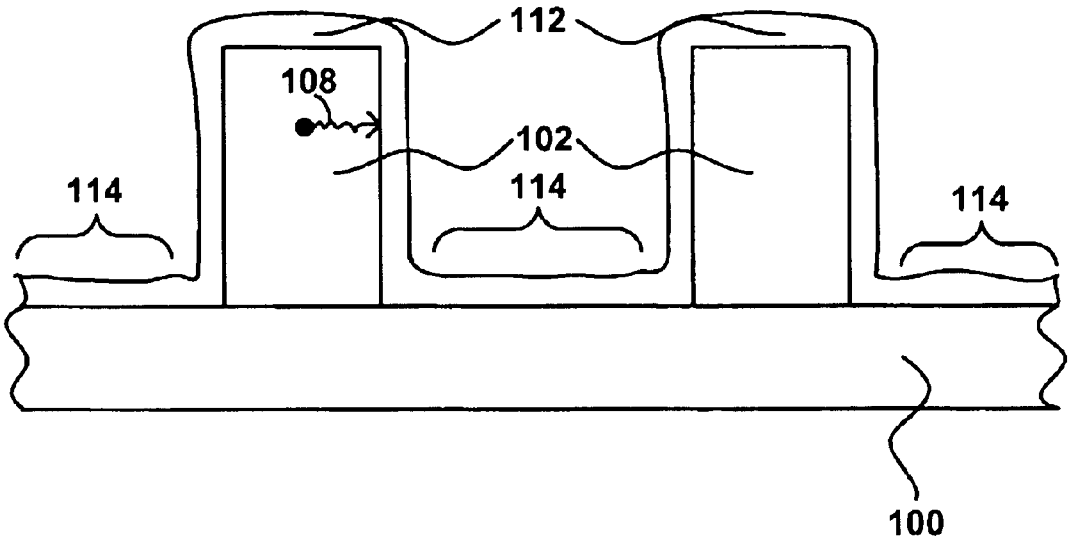
FIG. 4 is a side sectional view of a contaminant prevention structure disposed covering a matrix structure and the sub-pixel regions of a faceplate in accordance with one embodiment of the present claimed invention.

Referring now to FIG. 4, in the present embodiment, a contaminant prevention structure 112 is disposed covering matrix structure 102 and the sub-pixel regions 114 of faceplate 100. In this embodiment, the substantially non-porous material is a transparent material such as an oxide, or oxides of the lanthanide series, silicon dioxide, or indium tin oxide which is deposited over matrix structure 102 and sub-pixel regions 114 by chemical vapor deposition (CVD), evaporation, sputtering, or other means, to a thickness of approximately 10–500 nanometers. Although contaminant prevention structure 112 extends into sub-pixel regions 114, the presence of, for example, the oxide or oxides of the lanthanide series material in sub-pixel regions 114 does not adversely affect the formation or operation of the flat panel display. It will be understood, however, that the present invention is well suited to the use of various other substantially non-porous materials which are suited to confining contaminants within matrix structure 102 and which do not adversely affect the formation or operation of the flat panel display. The present invention is also well suited to varying the thickness of contaminant prevention structure 112 to greater than or less than the thickness range listed above.

In the embodiment of FIG. 4, the contaminant prevention structure 112 has a thickness which is sufficient to prevent penetration by electrons directed towards faceplate 100. Thus, as in the previously described embodiments, the present embodiment confines thermally generated contaminants within matrix structure 102, and further prevents contaminants from being formed by electron stimulated desorption. That is, the present embodiment substantially eliminates a major deleterious condition associated with electron bombardment of matrix structure 102.

Figure 5A:
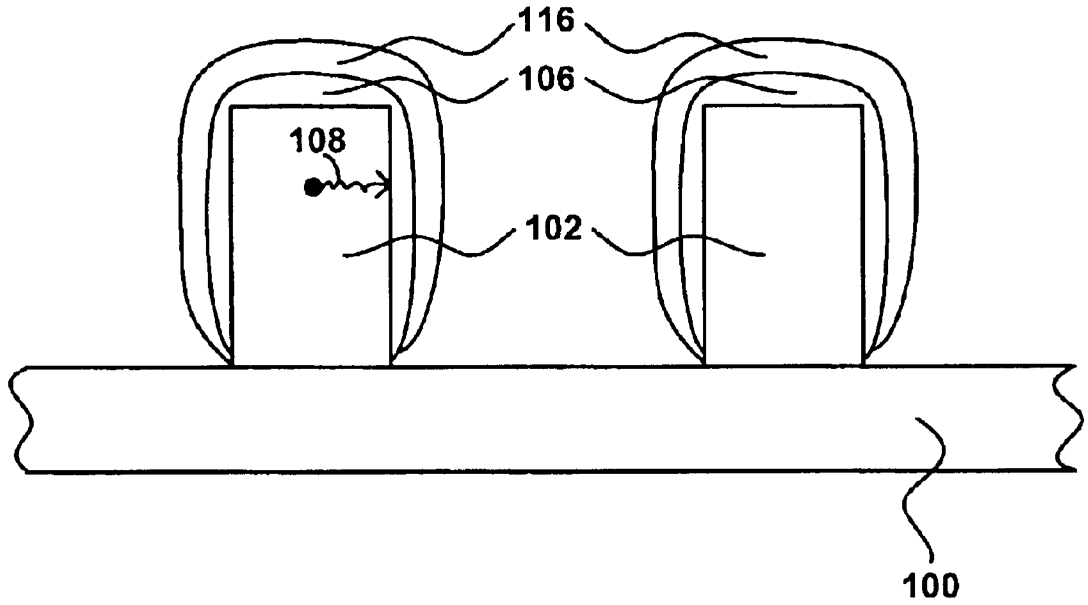
FIG. 5A is a side sectional view of the faceplate and matrix structure of FIG. 2 having a conductive coating disposed thereover in accordance with one embodiment of the present claimed invention.

With reference now to FIG. 5A, another embodiment of the present invention is shown in which a conductive coating 116 is disposed covering a contaminant prevention structure 106. (The present embodiment depicts the embodiment of FIG. 2, having conductive coating 116 disposed thereover.) In the present embodiment, conductive coating is preferably comprised of a low atomic number material. For purposes of the present application, a low atomic number material refers to a material comprised of elements having atomic numbers of less than 18. Additionally, a low atomic number material will reduce the electron scattering compared to a high atomic number material. More specifically, in one embodiment, conductive coating 116 is comprised, for example, of a CB800A DAG made by Acheson Colloids of Port Huron, Mich. In another embodiment, conductive coating 116 is comprised of a carbon-based conductive material. In still another embodiment, the layer of carbon-based conductive material is applied as a semi-dry spray to reduce shrinkage of conductive coating 116. In so doing, the present invention allows for improved control over the final depth of conductive coating 116. Although such deposition methods are recited above, it will be understood that the present invention is also well suited to using various other deposition methods to deposit various other conductive coatings over contaminant prevention structure 106. For example, the present invention is also well suited to the use of an aluminum coating which is applied by an angled evaporation.

As mentioned above, the top surface of matrix structure 102 is physically closer to the field emitter than is faceplate 100. By applying conductive coating 116 over the top surface of matrix structure 102, the present embodiment provides a constant potential surface. By providing a constant potential surface, the present embodiment reduces the possibility of potential arcing. As result, the present embodiment helps to ensure that the integrity of the phosphors and the overlying aluminum layer (not yet deposited in the embodiment of FIG. 5A) is maintained. In addition, the conductive encapsulating layer can be made more electrically or thermally conductive than the aluminum layer over the phosphor by making it thicker or of a more conductive material, thereby enabling the encapsulating material to readily prevent localized voltage spikes by carrying off high electrical currents of potential arcs and to better physically withstand any arcs that may occur. Furthermore, the conductive coating can be a single layer (as in FIG. 2) on the black matrix and need not be a double layer as drawn.

Figure 5B:
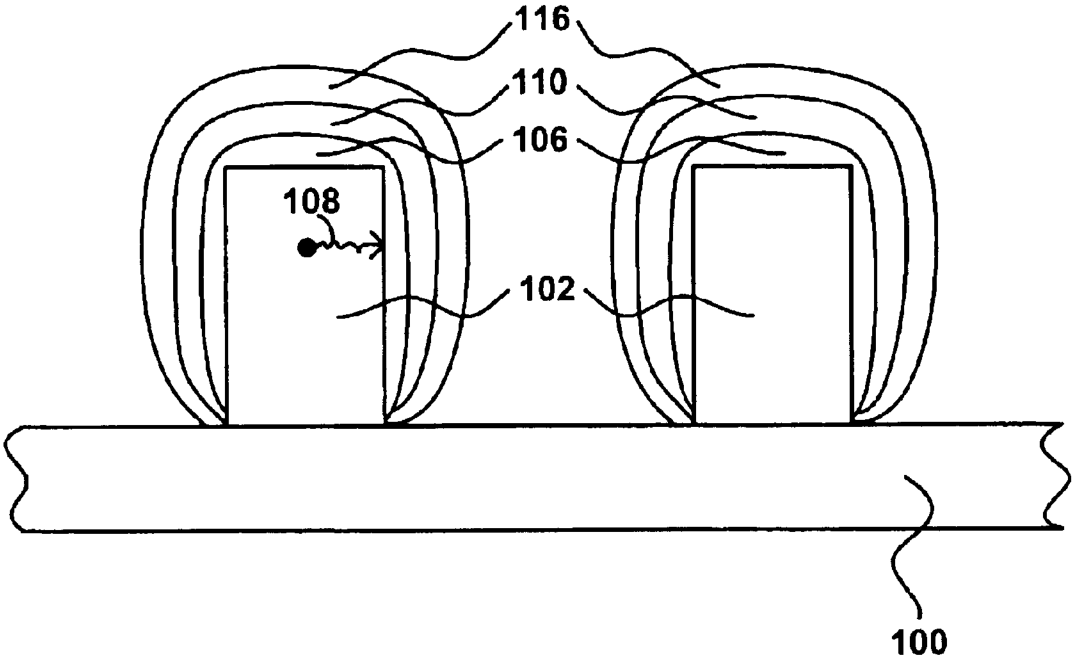
FIG. 5B is a side sectional view of the faceplate and matrix structure of FIG. 3 having a conductive coating disposed thereover in accordance with one embodiment of the present claimed invention.

With reference now to FIG. 5B, another embodiment of the present invention is shown in which a conductive coating 116 is disposed covering layers 106 and 110 of a multi-layer contaminant prevention structure. (The present embodiment depicts the embodiment of FIG. 3, having conductive coating 116 disposed thereover.) In the present embodiment, conductive coating is preferably comprised of a low atomic number material, or a material comprised predominantly of low atomic number elements. For purposes of the present application, a low atomic number material refers to a material comprised of elements having atomic numbers of less than 18. Although such a definition is recited herein, the present application is also well suited to an embodiment in which the conductive coating is not comprised of a low atomic number material. More specifically, in one embodiment, conductive coating 116 is comprised, for example, of a CB800A DAG made by Acheson Colloids of Port Huron, Mich. In another embodiment, conductive coating 116 is comprised of a carbon-based conductive material. In still another embodiment, the layer of carbon-based conductive material is applied as a semi-dry spray to reduce shrinkage of conductive coating 116. In so doing, the present invention allows for improved control over the final depth of conductive coating 116. Although such deposition methods are recited above, it will be understood that the present invention is also well suited to using various other deposition methods to deposit various other conductive coatings over layers 106 and 110 of the multi-layer contaminant prevention structure. For example, the present invention is also well suited to the use of an aluminum coating which is applied by an angled evaporation.

For the reasons set forth in detail above, the present embodiment provides a constant potential surface and decreases the chances that any electrical arcing will occur. As a result, the present embodiment helps to ensure that the integrity of the phosphors and the overlying aluminum layer (not yet deposited in the embodiment of FIG. 5B) is maintained.

Figure 5C:
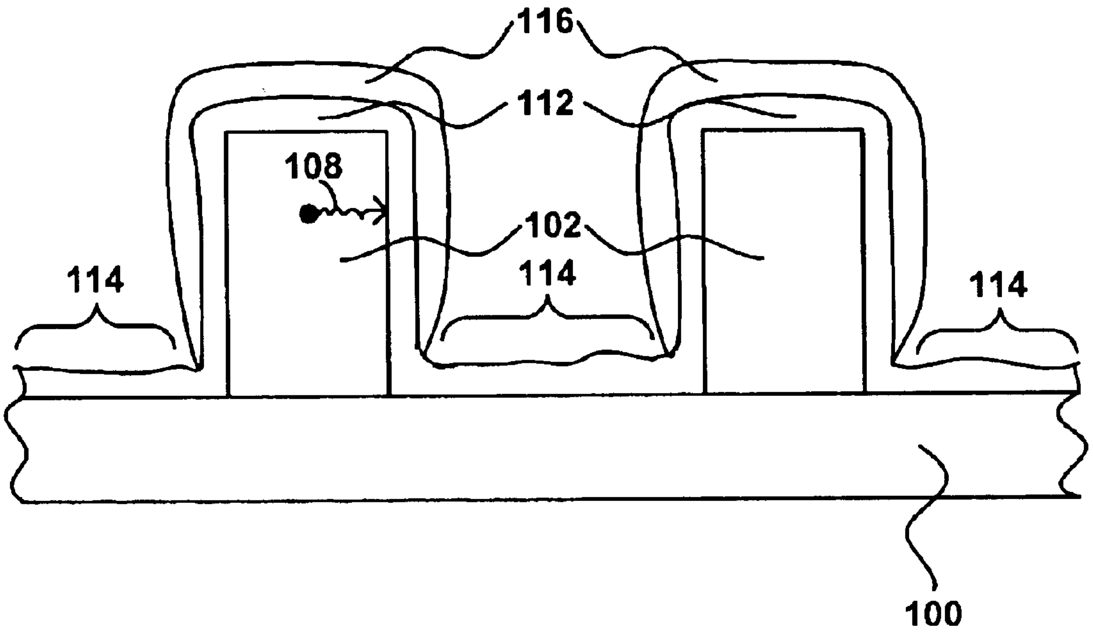
FIG. 5C is a side sectional view of the faceplate and matrix structure of FIG. 4 having a conductive coating disposed thereover in accordance with one embodiment of the present claimed invention.

With reference now to FIG. 5C, another embodiment of the present invention is shown in which a conductive coating 116 is disposed over contaminant prevention structure 112. (The present embodiment depicts the embodiment of FIG. 4, having conductive coating 116 disposed thereover.) In the present embodiment, conductive coating is preferably comprised of a low atomic number material. More specifically, in one embodiment, conductive coating 116 is comprised, for example, of a CB800A DAG made by Acheson Colloids of Port Huron, Mich. In another embodiment, conductive coating 116 is comprised of a carbon-based conductive material. In still another embodiment, the layer of carbon-based conductive material is applied as a semi-dry spray to reduce shrinkage of conductive coating 116. In so doing, the present invention allows for improved control over the final depth of conductive coating 116. Although such deposition methods are recited above, it will be understood that the present invention is also well suited to using various other deposition methods to deposit various other conductive coatings over contaminant prevention structure 112. For example, the present invention is also well suited to the use of an aluminum coating which is applied by an angled evaporation.

For the reasons set forth in detail above, the present embodiment provides a constant potential surface and decreases the chances that any electrical arcing will occur. As result, the present embodiment helps to ensure that the integrity of the phosphors and the overlying aluminum layer (not yet deposited in the embodiment of FIG. 5C) is maintained.

The above-described embodiments of the present invention have several substantial benefits associated therewith. For example, the present invention eliminates deleterious browning and outgassing associated with prior art polyimide based black matrix structures. Additionally, by preventing contaminants from being emitted by the matrix structure, the present invention prevents coating of the field emitters by the released contaminants. Additionally, by reducing the number and energy of electrons striking the polyimide, electron desorption of contaminants is reduced. As a result, the present invention extends the life of the field emitters. As yet an additional advantage, the contaminant prevention structure of the present invention also protects the matrix structure from potential damage during subsequent processing steps, and electrical arcs.

Figure 6A:
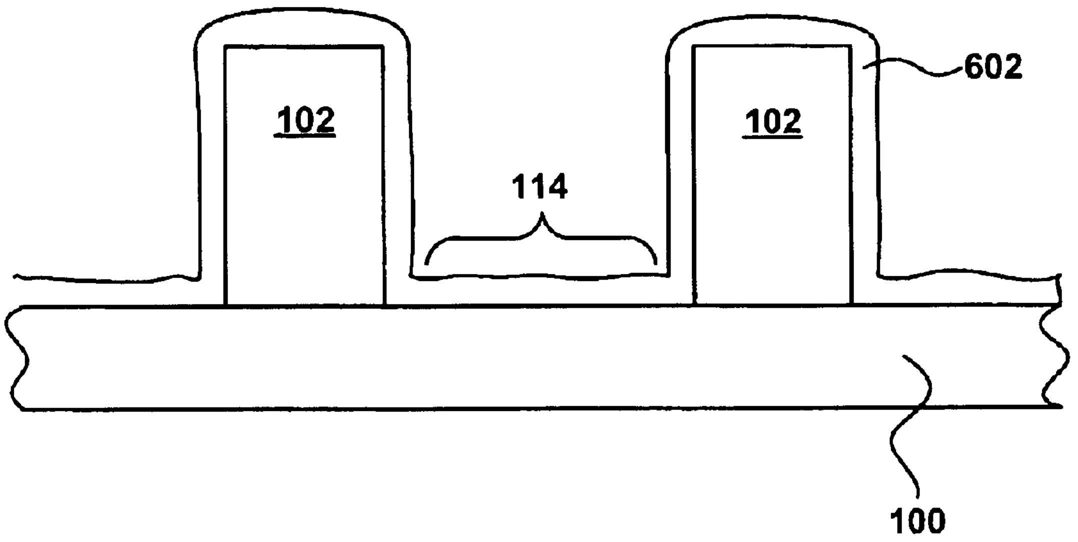
FIG. 6A is a side sectional view of the faceplate and matrix structure of FIG. 1A taken along line A—A wherein the matrix structure has a contaminant prevention structure comprised of a porous material disposed thereover in accordance with one embodiment of the present claimed invention.

Referring next to FIG. 6A, a side sectional view of faceplate 100 and matrix structure 102 taken along line A—A of FIG. 1A is shown. As mentioned above, matrix structure 102 is formed of polyimide material in the present embodiment. The present invention is also well suited to use with various other matrix forming materials which may cause deleterious contamination. As an example, the present invention is also well suited for use with a matrix structure which is comprised of a photosensitive polyimide formulation containing components other than polyimide. Additionally, the present invention is also well suited for use with various other physical components such as, for example, support structures and/or focus structures.

Referring still to FIG. 6A, in this embodiment of the present invention, a contaminant prevention structure 602 is disposed covering matrix structure 102 and the sub-pixel regions 114 of faceplate 100. Although contaminant prevention structure 602 extends into sub-pixel or pixel regions 114, the presence of the transparent porous or non-porous material in sub-pixel or pixel regions 114 does not adversely affect the formation or operation of the flat panel display. It will be understood, however, that the present invention is well suited to an embodiment in which the porous material of contaminant prevention structure 602 does not extend into sub pixel regions 114. In this embodiment, contaminant prevention structure 106 is comprised of a layer of porous material. In this embodiment, the porous material comprising contaminant prevention structure 602 prevents electrons and X-rays generated within the flat panel display from striking matrix structure 102. Additionally, the material comprising contaminant prevention structure 602 of the present invention does not outgas contaminants when struck by electrons or X-rays generated within the flat panel display. It will be understood that such contaminants include species such as, for example, $N_2$, $H_2$, $CH_4$, CO, $CO_2$, $O_2$, and $H_2O$.

With reference still to FIG. 6A, as stated above, in the present embodiment, contaminant prevention structure 602 is comprised of a porous material. In one embodiment, the porous material of contaminant prevention structure 602 is selected from the group consisting of: colloidal silica; silicon oxide; chemical vapor deposited silicon oxide, and an oxide or oxides of the lanthanide series (e.g. $Y_2O_3$, $La_2O_3$, $CeO_2$, $Pr_4O_{11}$, $Nd_2O_3$, $Pm_2O_3$, $Sm_2O_3$, $EuO_2$, $Gd_2O_3$, $TbO_2$, $Dy_2O_3$, $Ho_2O_3$, $Er_2O_3$, $Tm_2O_3$, $Yb_2O_3$, $Yb_2O_3$ and $Lu_2O_3$, and their mixtures). It should be noted that the stoichiometries presented herein are exemplary and the present invention is well suited to the use of various other stoichiometries. It will be understood, however, that the present invention is also well suited to use with various other porous materials such as, for example, silicon, oxides, nitrides, carbides, diamond, and the like. Moreover, the present invention is well suited to an embodiment in which the material of porous contaminant prevention structure 602 is a solid with a melting point of greater than approximately 500 degrees Celsius.

In another embodiment, the porous material of contaminant prevention structure 602 is comprised of a material selected from the group consisting of: high density oxides, nitride, $Gd_2O_3$, $Yb_2O_3$, $HfO_2$, $GdN_x$, $HfN_x$, and their mixtures. It should be noted that the stoichiometries presented herein are exemplary and the present invention is well suited to the use of various other stoichiometries. Compared with materials such as, for example, $SiO_2$ and $SiN_x$, the above listed materials are far more efficient in blocking electrons at energies greater than 10 keV. Furthermore, the above-listed materials match more closely to that of the D263 glass in coefficients of thermal expansion (CTE). As a result, the above-listed materials alleviate problems associated with glass cracking and bending. Also in the present embodiment, the materials used may be semi transparent as opposed to transparent such that transmission is greater than approximately 50 percent for optical wavelengths.

Referring again to FIG. 6A, in one embodiment, the porous material is silicon dioxide which is deposited over matrix structure 102 by atmospheric pressure physical vapor deposition (APPVD) or atmospheric pressure chemical vapor deposition (APCVD) to a thickness of approximately 3–10,000 nanometers. It will be understood, however, that the present invention is well suited to the use of various other porous materials which are suited to preventing electron and/or X-ray penetration therethrough by electrons and/or X-rays generated in the flat panel display. The present invention is also well suited to an embodiment in which the layer of porous material is applied, for example, by sputtering, e-beam evaporation, spraying methods, dip-coating methods, and the like. The present invention is also well suited to varying the thickness of contaminant prevention structure 602 to greater than or less than the thickness range listed above. More specifically, at 6 keV, the vast majority of electrons will not penetrate farther than 600 nanometers into silicon dioxide. At 10 keV, the vast majority of electrons will not penetrate farther than 1,000 nanometers into silicon dioxide. Therefore, in the present embodiment, the depth of the porous material comprising contaminant prevention structure 602 is adjusted so as to ensure that matrix structure 102 is not bombarded by electrons and/or X-rays generated within the flat panel display.

Referring yet again to FIG. 6A, in another embodiment, the porous material is an oxide or oxides of the lanthanide series which is deposited over matrix structure 102 by atmospheric pressure physical vapor deposition (APPVD) or atmospheric pressure chemical vapor deposition (APCVD)

to a thickness of approximately 7–250 nanometers. It will be understood, however, that the present invention is well suited to the use of various other porous materials which are suited to preventing electron and/or X-ray penetration therethrough by electrons and/or X-rays generated in the flat panel display. The present invention is also well suited to an embodiment in which the layer of porous material is applied, for example, by sputtering, e-beam evaporation, spraying methods, dip-coating methods, and the like. The present invention is also well suited to varying the thickness of contaminant prevention structure 602 to greater than or less than the thickness range listed above. More specifically, at 6 keV, the vast majority of electrons will not penetrate farther than 600 nanometers into silicon dioxide. At 10 keV, the vast majority of electrons will not penetrate farther than 250 nanometers into an oxide or oxides of the lanthanide series. Therefore, in the present embodiment, the depth of the porous material comprising contaminant prevention structure 602 is adjusted so as to ensure that matrix structure 102 is not bombarded by electrons and/or X-rays generated within the flat panel display.

Figure 6B:
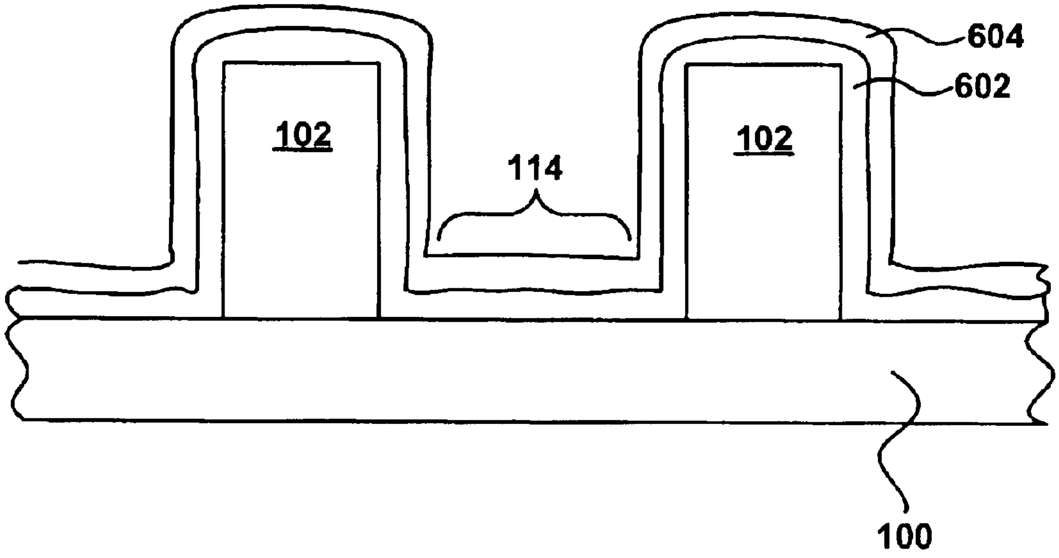
FIG. 6B is a side sectional view of the faceplate and matrix structure of FIG. 1A taken along line A—A wherein the matrix structure has a contaminant prevention structure comprised of a plurality of layers of porous material disposed thereover in accordance with one embodiment of the present claimed invention.

With reference next to FIG. 6B, in the present embodiment, a multi-layer contaminant prevention structure is disposed covering matrix structure 102. In this embodiment, the multi-layer contaminant prevention structure is comprised of a plurality of layers, 602 and 604, of porous material. As in the embodiment of FIG. 6A, the present embodiment prevents electrons and X-rays generated within the flat panel display from striking matrix structure 102. Additionally, the material comprising the contaminant prevention structure of the present invention does not outgas contaminants when struck by electrons or X-rays generated within the flat panel display.

With reference still to FIG. 6B, as stated above, in the present embodiment, multi-layer contaminant prevention structure is comprised of a plurality of layers of porous material. In one embodiment, at least one of the layers of porous material, 602 and 604, of the multi-layer contaminant prevention structure is selected from the group consisting of: colloidal silica; silicon oxide; chemical vapor deposited silicon oxide; and an oxide or oxides of the lanthanide series. It will be understood, however, that the present invention is also well suited to use with various other porous materials such as, for example, silicon, oxides, nitrides, carbides, graphite, aluminum, diamond, and the like. Moreover, the present invention is well suited to an embodiment in which at least one of the layers of porous material 602 and 604 is a solid with a melting point of greater than approximately 500 degrees Celsius.

Referring again to FIG. 6B, in one embodiment, the porous material of at least one of layers 602 and 604 is silicon dioxide which is deposited over matrix structure 102 by atmospheric pressure physical vapor deposition (APPVD) or atmospheric pressure chemical vapor deposition (APCVD) to a thickness of approximately 3–10,000 nanometers. It will be understood, however, that the present invention is well suited to the use of various other porous materials which are suited to preventing electron and/or X-ray penetration therethrough by electrons and/or X-rays generated in the flat panel display. The present invention is also well suited to an embodiment in which the layer of porous material is applied, for example, by sputtering, e-beam evaporation, spraying methods, dip-coating methods, and the like. The present invention is also well suited to varying the thickness of contaminant prevention structure to greater than or less than the thickness range listed above. In the present embodiment, the combined depth of the layers of porous material 602 and 604 comprising the contaminant prevention structure is adjusted so as to ensure that matrix structure 102 is not bombarded by electrons and/or X-rays generated within the flat panel display.

Referring yet again to FIG. 6B, in one embodiment, the porous material of at least one of layers 602 and 604 is an oxide, or oxides, of the lanthanide series which is deposited over matrix structure 102 by atmospheric pressure physical vapor deposition (APPVD) or atmospheric pressure chemical vapor deposition (APCVD) to a thickness of approximately 7–250 nanometers. It will be understood, however, that the present invention is well suited to the use of various other porous materials which are suited to preventing electron and/or X-ray penetration therethrough by electrons and/or X-rays generated in the flat panel display. The present invention is also well suited to an embodiment in which the layer of porous material is applied, for example, by sputtering, e-beam evaporation, spraying methods, dip-coating methods, and the like. The present invention is also well suited to varying the thickness of contaminant prevention structure to greater than or less than the thickness range listed above. In the present embodiment, the combined depth of the layers of porous material 602 and 604 comprising the contaminant prevention structure is adjusted so as to ensure that matrix structure 102 is not bombarded by electrons and/or X-rays generated within the flat panel display.

Figure 6C:
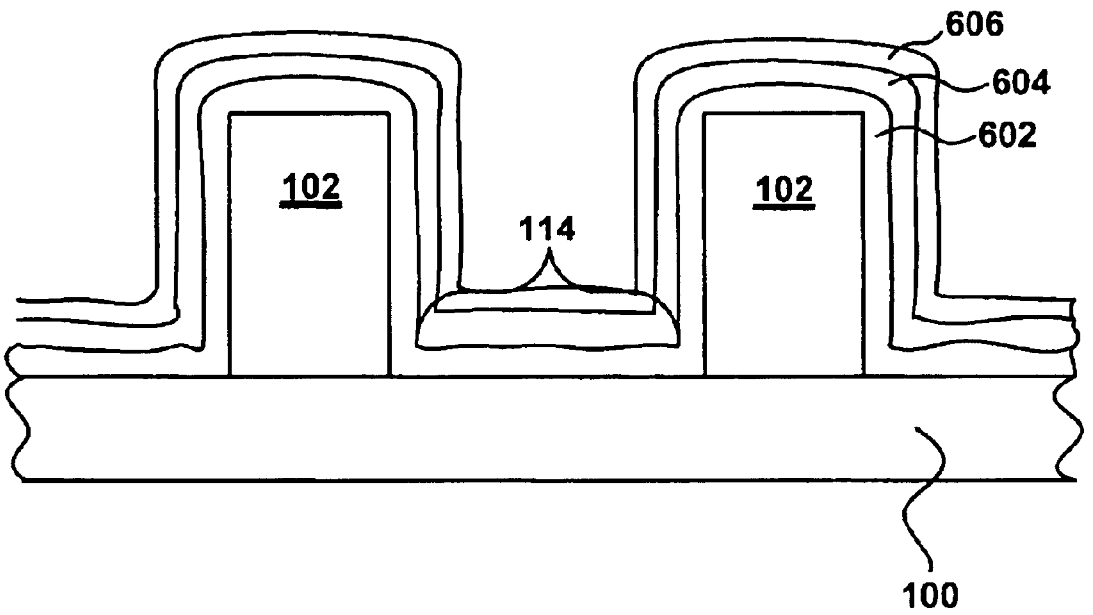
FIG. 6C is a side sectional view of the faceplate and matrix structure of FIG. 6B having a conductive coating disposed thereover in accordance with one embodiment of the present claimed invention.

With reference now to FIG. 6C, another embodiment of the present invention is shown in which a conductive coating 606 is disposed over a contaminant prevention structure. The present embodiment depicts the embodiment of FIG. 6B having conductive coating 606 disposed thereover. The present invention is, however, well suited to an embodiment in which conductive coating 606 is disposed over, for example, the embodiment of FIG. 6A. In the present embodiment, conductive coating is preferably comprised of a low atomic number material. More specifically, in one embodiment, conductive coating 606 is comprised, for example, of a CB800A DAG made by Acheson Colloids of Port Huron, Mich. In another embodiment, conductive coating 606 is comprised of a carbon-based conductive material. In still another embodiment, the layer of carbon-based conductive material is applied as a semi-dry spray to reduce shrinkage of conductive coating 606. In so doing, the present invention allows for improved control over the final depth of conductive coating 606. Although such deposition methods are recited above, it will be understood that the present invention is also well suited to using various other deposition methods to deposit various other conductive coatings (e.g. aluminum) over the contaminant prevention structure. Additionally, in the present embodiment, conductive coating 606 is deposited to a depth of 100–500 nanometers.

For the reasons set forth in detail above, the present embodiment provides a constant potential surface and decreases the chances that any electrical arcing will occur. As result, the present embodiment helps to ensure that the integrity of the phosphors and the overlying aluminum layer (not yet deposited in the embodiment of FIG. 6C) is maintained.

Figure 7A:
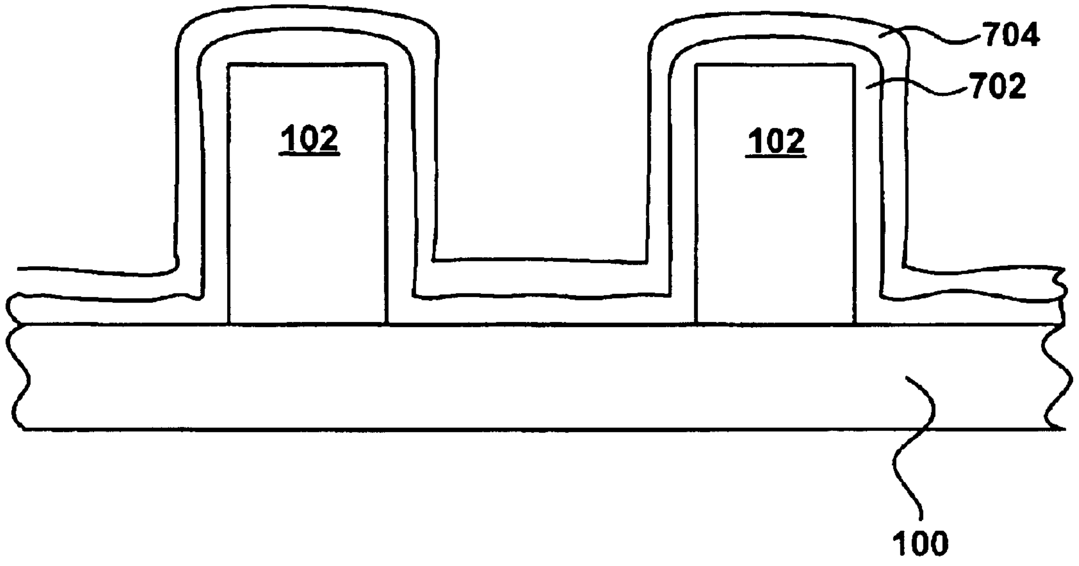
FIG. 7A is a side sectional view of the faceplate and matrix structure of FIG. 1A taken along line A—A wherein the matrix structure has a contaminant prevention structure comprised of a layer of porous material and a layer of non-porous material disposed thereover in accordance with one embodiment of the present claimed invention.

With reference next to FIG. 7A, in the present embodiment, a multi-layer contaminant prevention structure is disposed covering matrix structure 102. In this embodiment, the multi-layer contaminant prevention structure is comprised of a plurality of layers, 702 and 704. In this embodiment, layer 702 is comprised of a porous material, while layer 704 is comprised of a layer of substantially non-porous material. As in the embodiment of FIG. 6A, the present embodiment prevents electrons and X-rays generated within the flat panel display from striking matrix structure 102. This embodiment further confines thermally generated contaminants within matrix structure 102. Additionally, the material comprising the contaminant prevention structure of the present invention does not outgas contaminants when struck by electrons or X-rays generated within the flat panel display.

With reference still to FIG. 7A, as stated above, in the present embodiment, the multi-layer contaminant prevention structure is comprised of a plurality of layers of material. In one embodiment, porous material, 702 of the multilayer contaminant prevention structure is selected from the group consisting of: colloidal silica; silicon oxide; and chemical vapor deposited silicon oxide. It will be understood, however, that the present invention is also well suited to use with various other porous materials such as, for example, silicon, oxides, nitrides, carbides, diamond, and the like. Moreover, the present invention is well suited to an embodiment in which at least one of the layers of material 702 and 704 is a solid with a melting point of greater than approximately 500 degrees Celsius.

Referring again to FIG. 7A, in one embodiment, the plurality of layers of material are defined as follows. Layer 702 is comprised of a layer of indium tin oxide which is deposited to a depth of approximately 100–1,000 nanometers. Layer 704 is comprised of a silicon oxide which is deposited over matrix structure 102 to a thickness of approximately 30–1,000 nanometers. It will be understood, however, that the present invention is well suited to the use of various other porous and non-porous materials. The present invention is also well suited to an embodiment in which the layer of porous material is applied, for example, by sputtering, e-beam evaporation, spraying methods, dip-coating methods, and the like. The present invention is also well suited to varying the thickness of the contaminant prevention structure to greater than or less than the thickness range listed above. In the present embodiment, the combined depth of the layers of material 702 and 704 comprising the contaminant prevention structure is adjusted so as to ensure that matrix structure 102 is not bombarded by electrons and/or X-rays generated within the flat panel display.

Referring still to FIG. 7A, in another embodiment, the plurality of layers of material are defined as follows. Layer 702 is comprised of a layer of indium tin oxide which is deposited to a depth of approximately 100–1,000 nanometers. Layer 704 is comprised of an oxide, or oxides, of the lanthanide series which is deposited over matrix structure 102 to a thickness of approximately 7–250 nanometers. It will be understood, however, that the present invention is well suited to the use of various other porous and non-porous materials. The present invention is also well suited to an embodiment in which the layer of porous material is applied, for example, by sputtering, e-beam evaporation, spraying methods, dip-coating methods, and the like. The present invention is also well suited to varying the thickness of the contaminant prevention structure to greater than or less than the thickness range listed above. In the present embodiment, the combined depth of the layers of material 702 and 704 comprising the contaminant prevention structure is adjusted so as to ensure that matrix structure 102 is not bombarded by electrons and/or X-rays generated within the flat panel display.

Figure 7B:
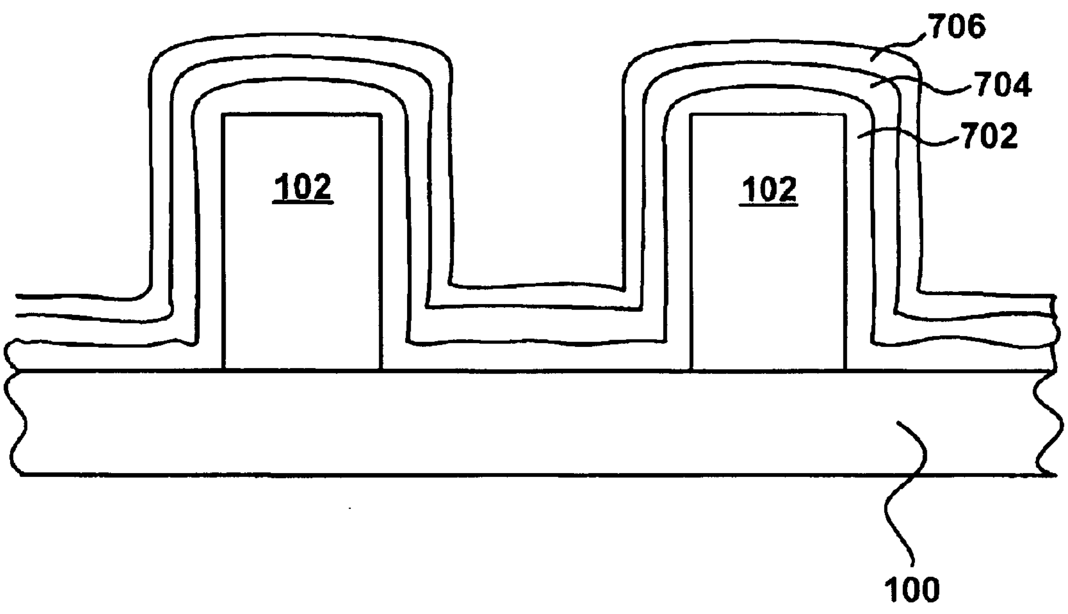
FIG. 7B is a side sectional view of the faceplate and matrix structure of FIG. 7A having a conductive coating disposed thereover in accordance with one embodiment of the present claimed invention.

With reference now to FIG. 7B, another embodiment of the present invention is shown in which a conductive coating 706 is disposed over a contaminant prevention structure. The present embodiment depicts one embodiment of FIG. 7A having conductive coating 706 disposed thereover. Specifically, in such an embodiment, layer 702 is comprised of a layer of indium tin oxide which is deposited to a depth of approximately 100–1,000 nanometers. Layer 704 is comprised of a silicon oxide which is deposited over matrix structure 102 to a thickness of approximately 30–1,000 nanometers. Layer 706 of this embodiment is comprised of a layer of aluminum which is deposited to a depth of approximately 30–200 nanometers. In the present embodiment, the conductive coating is preferably comprised of a low atomic number material. More specifically, in one embodiment, conductive coating 606 is comprised, for example, of a CB800A DAG made by Acheson Colloids of Port Huron, Mich. In another embodiment, conductive coating 606 is comprised of a carbon-based conductive material. In still another embodiment, the layer of carbon-based conductive material is applied as a semi-dry spray to reduce shrinkage of conductive coating 606. In so doing, the present invention allows for improved control over the final depth of conductive coating 606. Although such deposition methods are recited above, it will be understood that the present invention is also well suited to using various other deposition methods to deposit various other conductive coatings (e.g. aluminum) over the contaminant prevention structure.

With reference yet again to FIG. 7B, in another embodiment of the present invention conductive coating 706 is again disposed over a contaminant prevention structure. The present embodiment depicts one embodiment of FIG. 7A having conductive coating 706 disposed thereover. Specifically, in such an embodiment, layer 702 is comprised of a layer of indium tin oxide which is deposited to a depth of approximately 100–1,000 nanometers. Layer 704 is comprised of an oxide or oxides of the lanthanide series which is deposited over matrix structure 102 to a thickness of approximately 7–250 nanometers. Layer 706 of this embodiment is comprised of a layer of aluminum which is deposited to a depth of approximately 30–200 nanometers. In the present embodiment, the conductive coating is preferably comprised of a low atomic number material. More specifically, in one embodiment, conductive coating 606 is comprised, for example, of a CB800A DAG made by Acheson Colloids of Port Huron, Mich. In another embodiment, conductive coating 606 is comprised of a carbon-based conductive material. In still another embodiment, the layer of carbon-based conductive material is applied as a semi-dry spray to reduce shrinkage of conductive coating 606. In so doing, the present invention allows for improved control over the final depth of conductive coating 606. Although such deposition methods are recited above, it will be understood that the present invention is also well suited to using various other deposition methods to deposit various other conductive coatings (e.g. aluminum) over the contaminant prevention structure.

Referring still to FIG. 7B, in one embodiment, the contaminant structure is comprised of two distinct layers of material 702 and 704. In another embodiment, however, the contaminant prevention structure is comprised of a layer of porous material (e.g. layer 704 of silicon oxide) having non-porous material (e.g. the indium tin oxide of layer 702) impregnated therein. That is, the present invention is also well suited to an embodiment in which a layer of substantially porous material has substantially non-porous material impregnated therein. In one such embodiment, the layer of substantially porous material is deposited as is described above in detail. Additionally, the substantially non-porous material is impregnated within the layer of substantially non-porous material by, for example, sputtering, physical vapor deposition, and the like. Furthermore, the present embodiment is also well suited to having a conductive coating disposed thereover as is describe above in great detail.

Referring yet again to FIG. 7B, in another embodiment, the contaminant structure is comprised of two distinct layers of material 702 and 704. In another embodiment, however, the contaminant prevention structure is comprised of a layer of porous material (e.g. layer 704 of an oxide or oxides of the lanthanide series) having non-porous material (e.g. the indium tin oxide of layer 702) impregnated therein. That is, the present invention is also well suited to an embodiment in which a layer of substantially porous material has substantially non-porous material impregnated therein. In one such embodiment, the layer of substantially porous material is deposited as is described above in detail. Additionally, the substantially non-porous material is impregnated within the layer of substantially non-porous material by, for example, sputtering, physical vapor deposition, and the like. Furthermore, the present embodiment is also well suited to having a conductive coating disposed thereover as is describe above in great detail.

Figure 8:
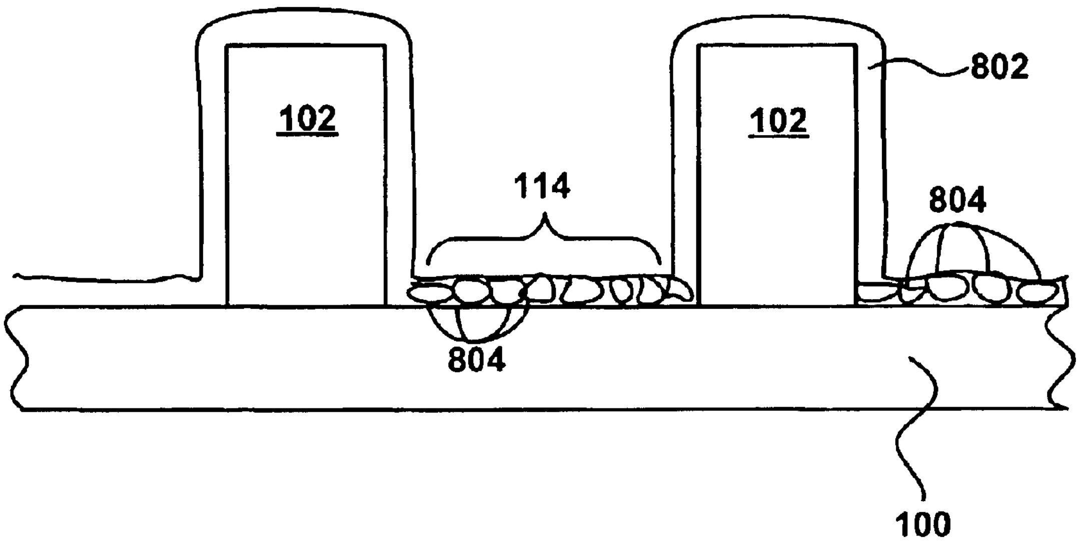
FIG. 8 is a side sectional view of the faceplate and matrix structure wherein the matrix structure has a dye/pigment-containing contaminant prevention structure disposed thereover in accordance with one embodiment of the present claimed invention.

Referring now to FIG. 8, a side sectional view of faceplate 100 and matrix structure 102 taken along line A—A of FIG. 1A is shown. As mentioned above, matrix structure 102 is formed of polyimide material in the present embodiment. The present invention is also well suited to use with various other matrix forming materials which may cause deleterious contamination. As an example, the present invention is also well suited for use with a matrix structure which is comprised of a photosensitive polyimide formulation containing components other than polyimide. Additionally, the present invention is also well suited for use with various other physical components such as, for example, support structures and/or focus structures. In this embodiment, contaminant prevention structure 802 is disposed over matrix structure 102 and into sub-pixel regions 114. Contaminant prevention structure 802 further includes a selectively light absorbing components (e.g. a dye or pigment) typically shown as 804. In one such embodiment, contaminant prevention structure 802 is comprised of silicon oxide doped with dye/pigment material. In so doing, the present embodiment provides a color filter which enhances display contrast by reducing reflected ambient light. Also, the present embodiment is well suited to having the dye/pigment disposed only in those portions of contaminant prevention structure 802 which reside above sub-pixel regions 114. The present embodiment is also well suited to having the dye/pigment disposed in the entire contaminant prevention structure 802.

Referring again to FIG. 8, a side sectional view of faceplate 100 and matrix structure 102 taken along line A—A of FIG. 1A is shown. As mentioned above, matrix structure 102 is formed of polyimide material in the present embodiment. The present invention is also well suited to use with various other matrix forming materials which may cause deleterious contamination. As an example, the present invention is also well suited for use with a matrix structure which is comprised of a photosensitive polyimide formulation containing components other than polyimide. Additionally, the present invention is also well suited for use with various other physical components such as, for example, support structures and/or focus structures. In this embodiment, contaminant prevention structure 802 is disposed over matrix structure 102 and into sub-pixel regions 114. Contaminant prevention structure 802 further includes a selectively light absorbing components (e.g. a dye or pigment) typically shown as 804. In one such embodiment, contaminant prevention structure 802 is comprised of an oxide or oxides of the lanthanide series doped with dye/pigment material. In so doing, the present embodiment provides a color filter which enhances display contrast by reducing reflected ambient light. Also, the present embodiment is well suited to having the dye/pigment disposed only in those portions of contaminant prevention structure 802 which reside above sub-pixel regions 114. The present embodiment is also well suited to having the dye/pigment disposed in the entire contaminant prevention structure 802.

For the reasons set forth in detail above, the present embodiment provides a constant potential surface and decreases the chances that any electrical arcing will occur. As result, the present embodiment helps to ensure that the integrity of the phosphors and the overlying aluminum layer (not yet deposited in the embodiment of FIG. 7B) is maintained.

Thus, in one embodiment, the present invention provides a matrix structure which does not deleteriously outgas when subjected to thermal variations. The present invention also provides an embodiment in which a matrix structure meets the above-listed need and which reduces unwanted electron stimulated desorption of contaminants. Finally, in another embodiment, the present invention provides a matrix structure which meets both of the above needs and which also achieves electrical robustness in the faceplate by providing a constant potential surface which reduces the possibility of potential arcing. Also, it will be understood that the conductive matrix structure of the present invention is applicable in numerous types of flat panel displays.

Figure 9:
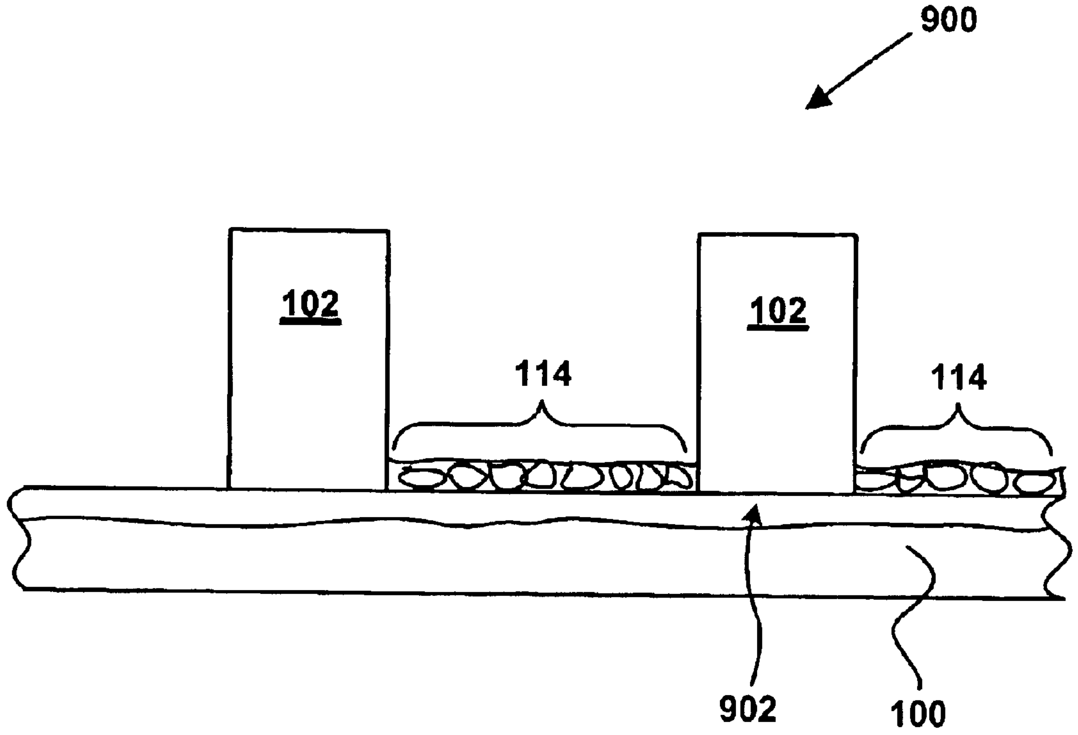
FIG. 9 is a side sectional view of a protected faceplate structure in which is shown a faceplate having a barrier layer disposed thereover in accordance with one embodiment of the present claimed invention.

Referring now to FIG. 9, a side sectional view of a protected faceplate structure 900 of a field emission display device is shown. In this embodiment, a faceplate 100 has a barrier layer 902 disposed over one side thereof. In this embodiment, matrix structure 102 defines phosphor containing area (also referred to as sub-pixel regions) which are shown as areas 114. During operation, electrons are emitted from field emitter located at a cathode portion, not shown, of the field emission display device. These emitted electrons are then accelerated, using a potential field, towards the phosphor containing areas 114. Upon being impinged by the electrons, the phosphors within phosphor containing areas 114 generate light. As mentioned above, a conventional faceplate is subject to degradation when impinged by the electrons. In the present embodiment, however, (and as will be discussed in further detail below) barrier layer 902 prevents degradation of faceplate 100 by electron bombardment.

With reference still to FIG. 9, in the present embodiment barrier layer 902 is comprised of a substantially transparent, electron-damage resistant material. In the present embodiment, barrier layer 902 is deposited over faceplate 100 as one of the initial process steps performed in the formation of the field emission display device. That is, barrier layer 902 of the present embodiment is disposed above faceplate 100 prior to the formation of matrix 102, and prior to the formation of phosphor containing areas 114. Although such an order of formation is specifically recited in the present embodiment, the present invention is also well suited to varying the order in which the barrier layer and the various other features of the field emission display are fabricated.

Referring still to FIG. 9, in one embodiment, barrier layer 902 has a thickness sufficient to prevent substantial penetration of electrons through barrier layer 902 such that the electrons do not impinge faceplate 100. Specifically, in one embodiment, barrier layer 902 is comprised of silicon dioxide having a thickness of approximately 100 nanometers. Although such a specific type of material and thickness of material is recited in the present embodiment, the present invention is well suited to the use of various other materials and/or to various (e.g. greater or lesser) thicknesses of material. Moreover, in the present embodiment, the combination of material or materials and the thickness thereof provides a barrier layer which does not significantly reduce the transmission of light through the faceplate, and which protects the faceplate from electron bombardment induced degradation. In another embodiment, barrier layer 902 is comprised of an oxide or oxides of the lanthanide series having a thickness of approximately 25 nanometers. Although such a specific type of material and thickness of material is recited in the present embodiment, the present invention is well suited to the use of various other materials and/or to various (e.g. greater or lesser) thicknesses of material. Moreover, in the present embodiment, the combination of material or materials and the thickness thereof provides a barrier layer which does not significantly reduce the transmission of light through the faceplate, and which protects the faceplate from electron bombardment induced degradation.

With reference yet again to FIG. 9, in one embodiment, in addition to preventing substantial impingement of electrons against faceplate 100, barrier layer 902 prevents the migration of contaminants from faceplate 100 into the field emission display device. As a result, faceplate 100 is no longer a potentially substantial source of contaminants which can damage sensitive features of the field emission display device. Hence, barrier layer 902 enables use of a desirable and inexpensive high-sodium glass substrate as faceplate 100. Unlike conventional field emission displays in which the sodium of the high-sodium glass is often migrated (due to electron bombardment) into the active region of the field emission display device, the present embodiment prevents the migration of sodium from faceplate 100 into the field emission display device. In yet another embodiment, in addition to preventing substantial impingement of electrons against faceplate 100, and in addition to preventing the migration of contaminants from faceplate 100 into the field emission display device, barrier layer 902 is also electrically conductive. In so doing, barrier layer 902 can be used to bleed excess charge from faceplate 100.

Figure 10:
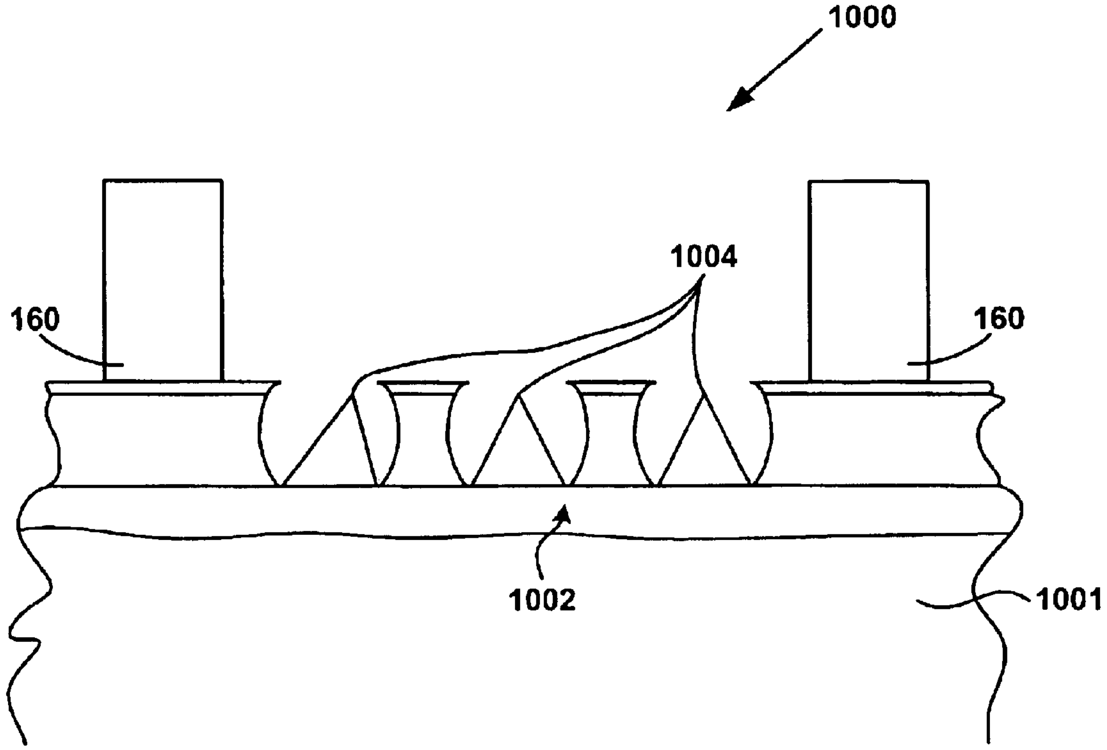
FIG. 10 is a side sectional view of a protected cathode substrate structure in which is shown a cathode substrate having a barrier layer disposed thereover in accordance with one embodiment of the present claimed invention.

Referring now to FIG. 10, a side sectional view of a protected cathode substrate structure 1000 of a field emission display device is shown. In this embodiment, a cathode substrate 1001 has a barrier layer 1002 disposed over one side thereof. In this embodiment, field emitters, typically shown as 1004, are shown disposed above cathode substrate 1001 and between focus structure 160. During operation, electrons are emitted from field emitters 1004. These emitted electrons are then accelerated, using a potential field, towards phosphor containing areas, not shown. Upon being impinged by the electrons, the phosphors within phosphor containing areas generate light. As mentioned above, a conventional cathode substrate is subject to degradation when impinged by the electrons which, through, for example, scattering, impact the cathode substrate. In the present embodiment, however, (and as will be discussed in further detail below) barrier layer 1002 prevents degradation of cathode substrate 1001 by electron bombardment.

With reference still to FIG. 10, in the present embodiment barrier layer 1002 is comprised of a substantially transparent, electron-damage resistant material. In the present embodiment, barrier layer 1002 is deposited over cathode substrate 1001 as one of the initial process steps performed in the formation of the field emission display device. That is, barrier layer 1002 of the present embodiment is disposed above cathode substrate 1001 prior to the formation of matrix field emitters 1004, and prior to the formation of focus structure 160. Although such an order of formation is specifically recited in the present embodiment, the present invention is also well suited to varying the order in which the barrier layer and the various other features of the field emission display are fabricated.

Referring still to FIG. 10, in one embodiment, barrier layer 1002 has a thickness sufficient to prevent substantial penetration of electrons through barrier layer 1002 such that the electrons do not impinge cathode substrate 1001. Specifically, in one embodiment, barrier layer 1002 is comprised of silicon dioxide having a thickness of approximately 100 nanometers. Although such a specific type of material and thickness of material is recited in the present embodiment, the present invention is well suited to the use of various other materials and/or to various (e.g. greater or lesser) thicknesses of material. In another embodiment, barrier layer 1002 is comprised of an oxide or oxides of the lanthanide series having a thickness of approximately 25 nanometers. Although such a specific type of material and thickness of material is recited in the present embodiment, the present invention is well suited to the use of various other materials and/or to various (e.g. greater or lesser) thicknesses of material.

With reference yet again to FIG. 10, in one embodiment, in addition to preventing substantial impingement of electrons against cathode substrate 1001, barrier layer 1002 prevents the migration of contaminants from cathode substrate 1001 into the field emission display device. As a result, cathode substrate 1001 is no longer a potentially substantial source of contaminants which can damage sensitive features of the field emission display device. Hence, barrier layer 1002 enables use of a desirable and inexpensive high-sodium glass substrate as cathode substrate 1001. Unlike conventional field emission displays in which the sodium of the high-sodium glass is often migrated (due to electron bombardment) into the active region of the field emission display device, the present embodiment prevents the migration of sodium from cathode substrate 1001 into the field emission display device. In yet another embodiment, in addition to preventing substantial impingement of electrons against cathode substrate 1001, and in addition to preventing the migration of contaminants from cathode substrate 1001 into the field emission display device, barrier layer 1002 is also electrically conductive. In so doing, barrier layer 1002 can be used to bleed excess charge from cathode substrate 1001.

Figure 11:
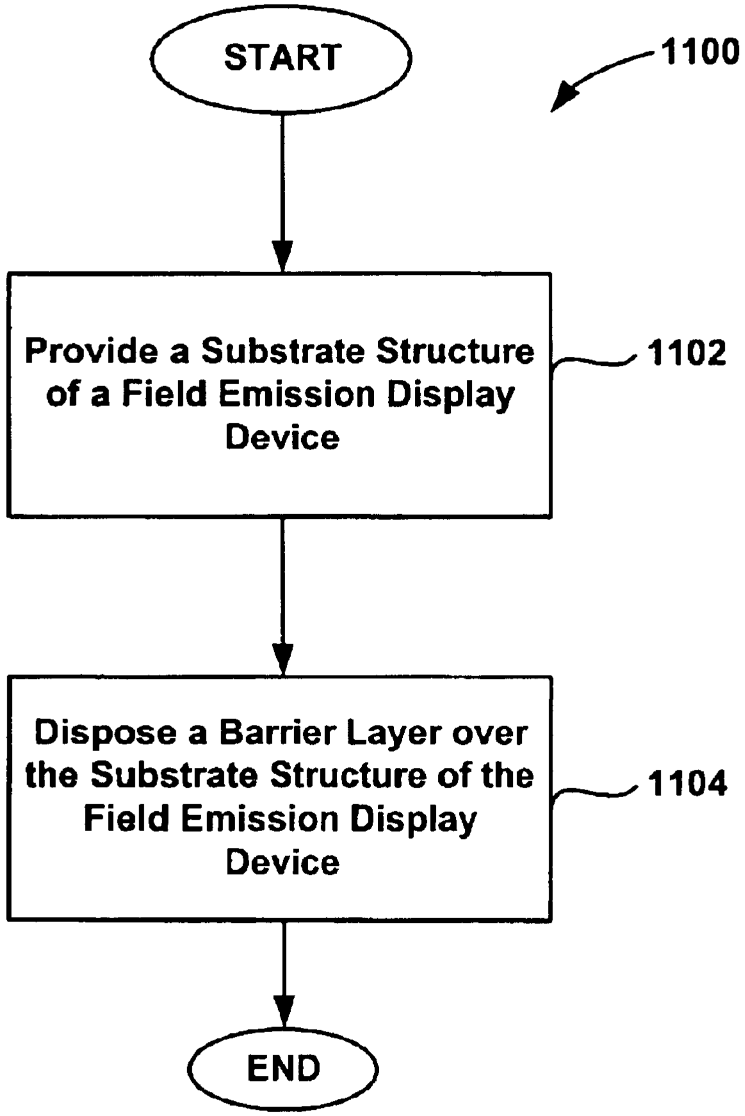
FIG. 11 is a flow chart of steps performed to provide a protected substrate structure in accordance with one embodiment of the present claimed invention.

With reference now to FIG. 11, a flow chart 1100 of steps performed in accordance with one embodiment of the present invention is shown. In the present, and as described above in conjunction with FIGS. 9 and 10, the present embodiment recites a method for protecting a substrate structure of a field emission display device. Specifically, in one embodiment, the present invention comprises at step 1102, providing a substrate structure of a field emission display device. Such a substrate structure includes, for example, faceplate 100 of FIG. 9 or cathode substrate 1001 of FIG. 10. Furthermore, the present invention enables the use of a high-sodium glass substrate structure for the field emission display device in one embodiment.

Next, at step 1104, the present embodiment recites disposing a barrier layer over the substrate structure, wherein the barrier layer is adapted to prevent degradation of the substrate structure due to bombardment by electrons. As mentioned above, in one embodiment, barrier layer 1002 is comprised of a substantially transparent, electron-damage resistant material (e.g. silicon dioxide, $Al_2O_3$, $CrO_x$, ZnO, $Si_3N_4$, $SiO_2$, $TaO_5$, Tin Oxide, ITO, $ZrO_2$, $Y_2O_3$, $TiO_2$, and MgO and combinations thereof) having a thickness (e.g. 100 nanometers) sufficient to prevent substantial penetration of electrons therethrough. In another embodiment, barrier layer 1002 is comprised of a substantially transparent, electron-damage resistant material (e.g. an oxide, or oxides, of the lanthanide series such as $Y_2O_3$, $La_2O_3$, $CeO_2$, $Pr_4O_{11}$, $Nd_2O_3$, $Pm_2O_3$, $Sm_2O_3$, $EuO_2$, $Gd_2O_3$, $TbO_2$, $Dy_2O_3$, $Ho_2O_3$, $Er_2O_3$, $Tm_2O_3$, $Yb_2O_3$, $Yb_2O_3$ and $Lu_2O_3$, and their mixtures) having a thickness (e.g. 25 nanometers) sufficient to prevent substantial penetration of electrons therethrough. It should be noted that the stoichiometries presented herein are exemplary and the present invention is well suited to the use of various other stoichiometries. Also, in one embodiment, the barrier layer prevents the migration of contaminants from the substrate into the active region. In still another embodiment, the barrier layer is conductive such that it can be used to bleed excess charge from the substrate structure.

In another embodiment, the material of barrier layer 1002 is comprised of a material selected from the group consisting of: high density oxides, nitride, $Gd_2O_3$, $Yb_2O_3$, $HfO_2$, $GdN_x$, $HfN_x$, and their mixtures. It should be noted that the stoichiometries presented herein are exemplary and the present invention is well suited to the use of various other stoichiometries. Compared with materials such as, for example, $SiO_2$ and $SiN_x$, the above listed materials are far more efficient in blocking electrons at energies greater than 10 keV. Furthermore, the above-listed materials match more closely to that of the D263 glass in coefficients of thermal expansion (CTE). As a result, the above-listed materials alleviate problems associated with glass cracking and bending. Also in the present embodiment, the materials used may be semi transparent as opposed to transparent such that transmission is greater than approximately 50 percent for optical wavelengths.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the Claims appended hereto and their equivalents.

What is claimed is:

1. A protected faceplate structure of a field emission display device, said protected faceplate structure comprising:

a) a faceplate of a field emission display device, said faceplate adapted to have phosphor containing areas disposed above one side thereof; and b) a barrier layer comprised of an oxide of the lanthanide series, said barrier layer disposed over said one side of said faceplate, said barrier layer adapted to prevent degradation of said faceplate due to electron bombardment by electrons directed towards said phosphor containing areas, wherein said barrier layer is comprised of a substantially transparent, electron-damage resistant material and includes a selectively light absorbing component.

2. The protected faceplate structure of a field emission display device of claim 1, wherein said faceplate is comprised of a high-sodium glass substrate.

3. The protected faceplate structure of a field emission display device of claim 2, wherein said barrier layer prevents the migration of sodium from said faceplate into said field emission display device.

4. The protected faceplate structure of a field emission display device of claim 1, wherein said barrier layer has a thickness sufficient to prevent substantial penetration of said electrons through said barrier layer such that said electrons do not impinge said faceplate.

5. The protected faceplate structure of a field emission display device of claim 1, wherein said barrier layer is selected from the group consisting of: $Y_2O_3$, $La_2O_3$, $CeO_2$, $Pr_4O_{11}$, $Nd_2O_3$, $Pm_2O_3$, $Sm_2O_3$, $EuO_2$, $Gd_2O_3$, $TbO_2$, $Dy_2O_3$, $Ho_2O_3$, $Er_2O_3$, $Tm_2O_3$, $Yb_2O_3$, $Yb_2O_3$ and $Lu_2O_3$, and their mixtures.

6. The protected faceplate structure of a field emission display device of claim 5, wherein said barrier layer has a thickness of approximately 25 nanometers.

7. The protected faceplate structure of a field emission display device of claim 1, wherein said barrier layer prevents the migration of contaminants from said faceplate into said field emission display device.

8. The protected faceplate structure of a field emission display device of claim 1, wherein said barrier layer is electrically conductive.

9. The protected faceplate structure of a field emission display device of claim 1, wherein said selectively light absorbing component is selected from the group consisting of dyes and pigments.

10. The protected faceplate structure of a field emission display device of claim 1, wherein each subpixel of said faceplate includes a different selectively light absorbing component.

11. The protected faceplate structure of a field emission display device of claim 1, wherein said barrier layer is selected from the group consisting of: high density oxides, nitride, $Gd_2O_3$, $Yb_2O_3$, $HfO_2$, $GdN_x$, $HfN_x$, and their mixtures.

12. The protected faceplate structure of a field emission display device of claim 11, wherein said barrier layer has a thickness of approximately 25 nanometers.

13. A protected cathode substrate structure of a field emission display device, said protected cathode substrate structure comprising:

a) a cathode substrate of a field emission display device, said cathode substrate adapted to have an electron emitting structure disposed above one side thereof; and b) a barrier layer comprised of an oxide of the lanthanide series disposed over said one side of said cathode substrate, said barrier layer adapted to prevent degradation of said cathode substrate due to electron bombardment by electrons originating from said electron emitting structure, wherein said barrier layer is comprised of a substantially transparent, electron-damage resistant material and is electrically conductive.

14. The protected cathode substrate structure of a field emission display device of claim 13, wherein said cathode substrate is comprised of a high-sodium glass.

15. The protected cathode substrate structure of a field emission display device of claim 14, wherein said barrier layer prevents the migration of sodium from said cathode substrate into said field emission display device.

16. The protected cathode substrate structure of a field emission display device of claim 13, wherein said barrier layer has a thickness sufficient to prevent substantial penetration of said electrons through said barrier layer such that said electrons do not impinge said cathode substrate.

17. The protected cathode substrate structure of a field emission display device of claim 13, wherein said barrier layer is comprised of: $Y_2O_3$, $La_2O_3$, $CeO_2$, $Pr_4O_{11}$, $Nd_2O_3$, $Pm_2O_3$, $Sm_2O_3$, $EuO_2$, $Gd_2O_3$, $TbO_2$, $Dy_2O_3$, $Ho_2O_3$, $Er_2O_3$, $Tm_2O_3$, $Yb_2O_3$, $Yb_2O_3$ and $Lu_2O_3$, and their mixtures.

18. The protected cathode substrate structure of a field emission display device of claim 17, wherein said barrier layer has a thickness of approximately 25 nanometers.

19. The protected cathode substrate structure of a field emission display device of claim 13, wherein said barrier layer prevents the migration of contaminants from said cathode substrate into said field emission display device.

20. The protected cathode substrate structure of a field emission display device of claim 13, wherein said barrier layer is comprised of: high density oxides, nitride, $Gd_2O_3$, $Yb_2O_3$, $HfO_2$, $GdN_x$, $HfN_x$, and their mixtures.

21. The protected cathode substrate structure of a field emission display device of claim 20, wherein said barrier layer has a thickness of approximately 25 nanometers.

* * * * *